March 29, 1966     T. C. ABBOTT, JR., ETAL     3,243,776
SCANNING SYSTEM FOR REGISTERING AND READING CHARACTERS
Filed Feb. 8, 1963     14 Sheets-Sheet 1
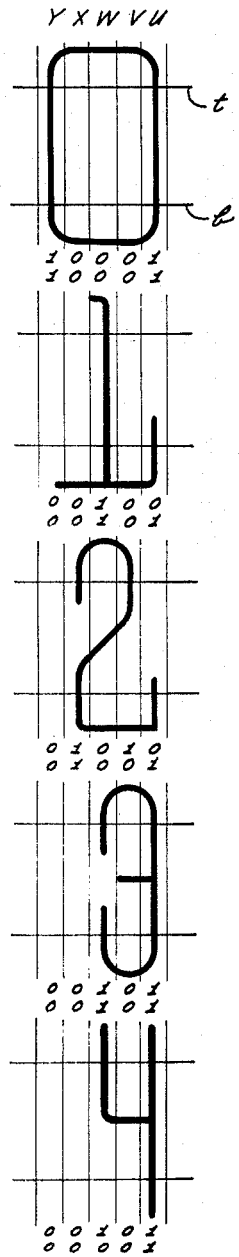
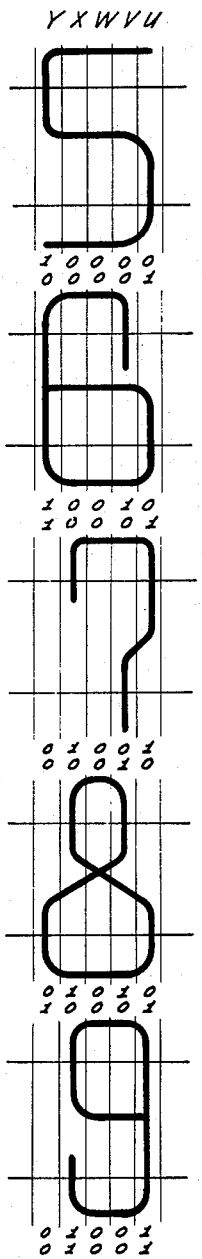
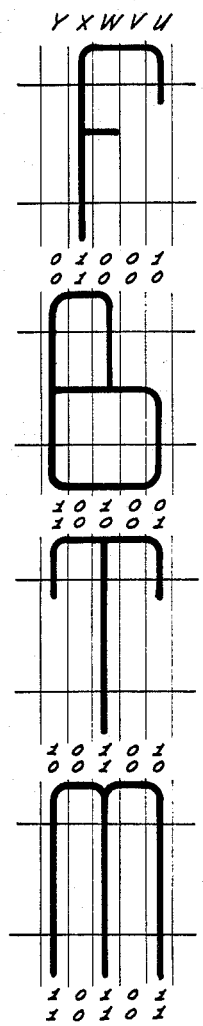
Fig. 1
INVENTORS:
Tirey C. Abbott, Jr.
Sydney Glazer
Melvin S. Armstrong
Arthur M. Angel
Ladimer J. Andrews
Their Attorneys March 29, 1966 T. C. ABBOTT, JR., ETAL 3,243,776
SCANNING SYSTEM FOR REGISTERING AND READING CHARACTERS
Filed Feb. 8, 1963 14 Sheets-Sheet 2

INVENTORS:
Tirey C. Abbott, Jr.
Sydney Glazer
Melvin S Armstrong
Arthur M. Angel
Lodimer J. Andrews Their Attorneys INVENTORS:
Tirey C. Abbott, Jr.
Sydney Glaser
Melvin S. Armstrong
Arthur M. Angel
Lodimer J. Andrews Louis A. Kline
John J. Matlago
Dominick Nardelli
Their Attorneys

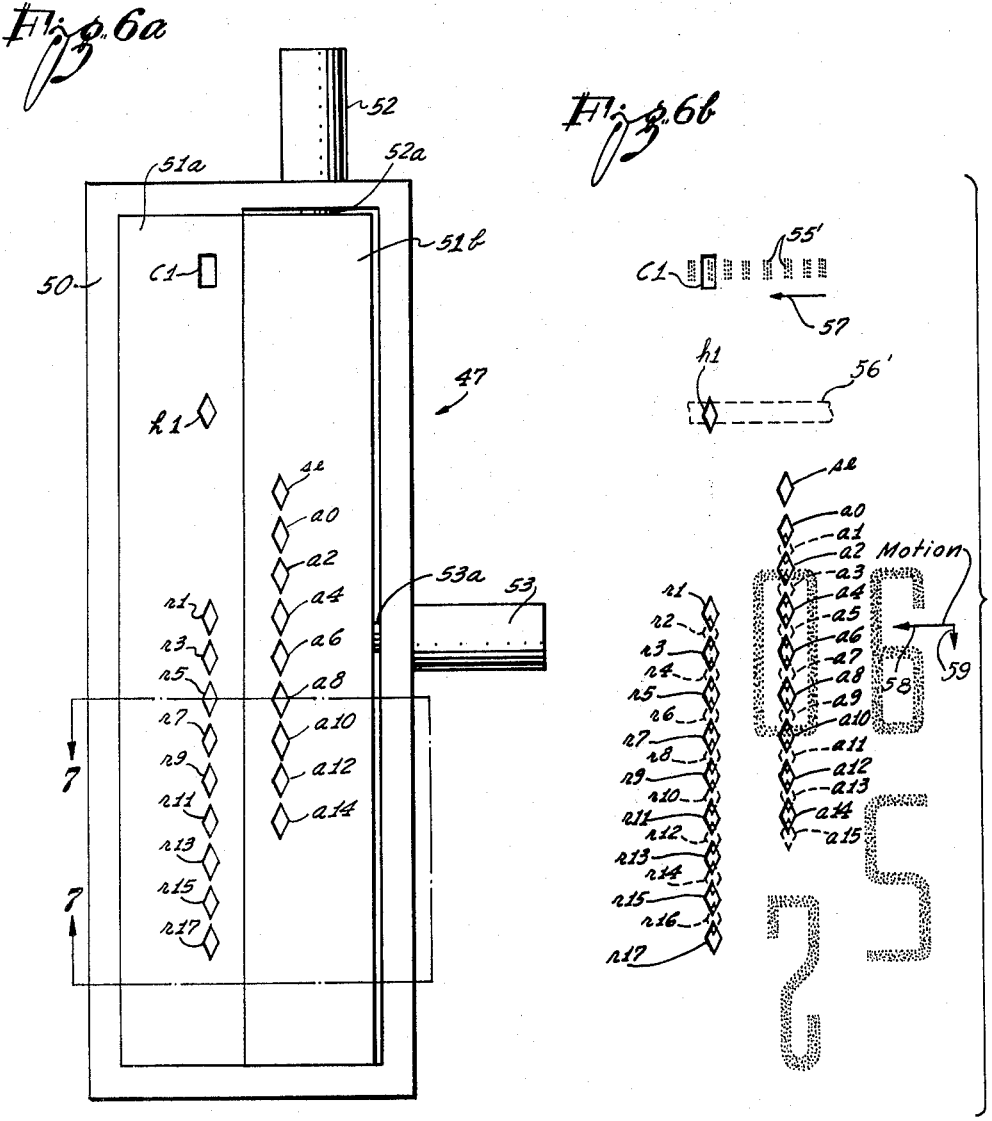

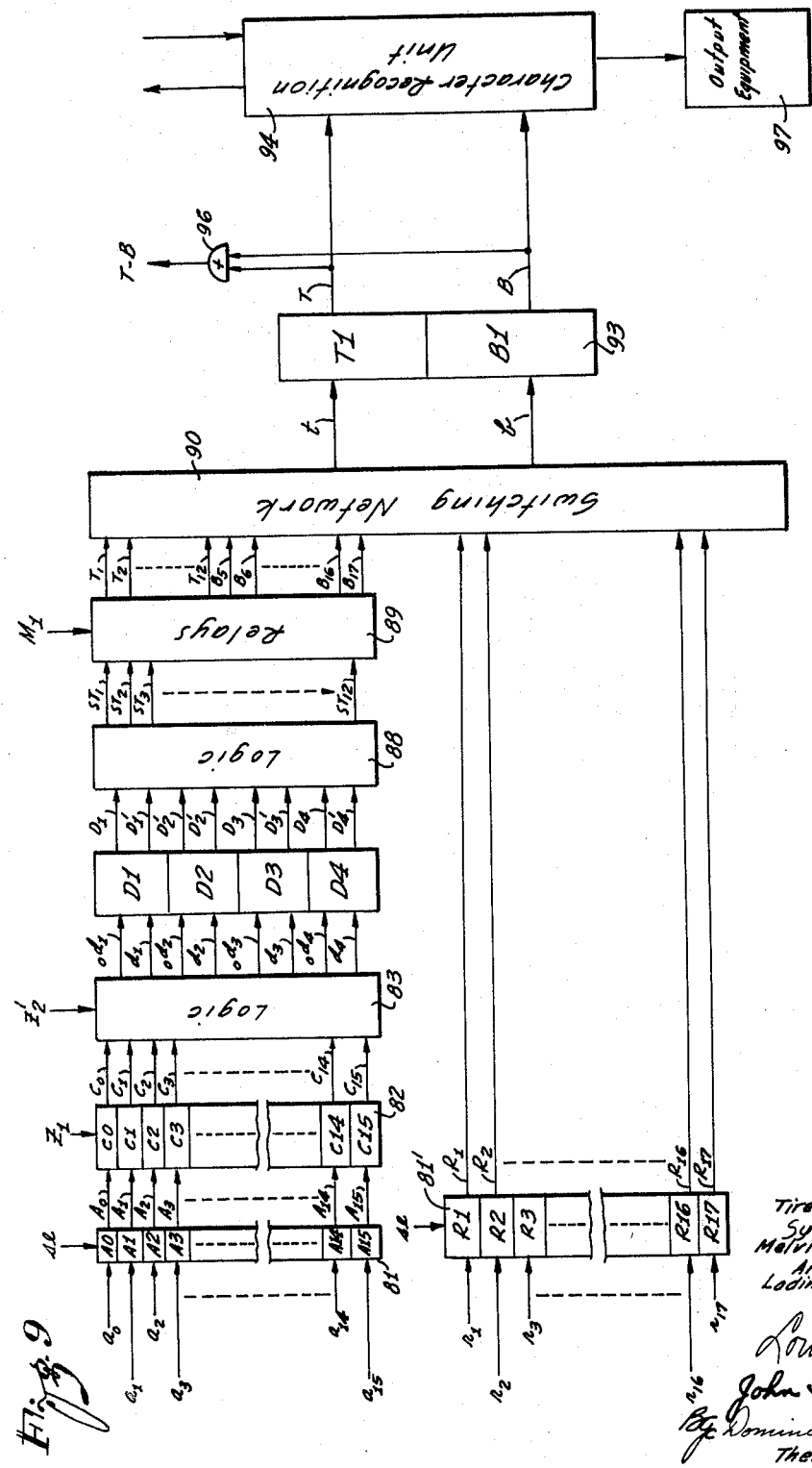

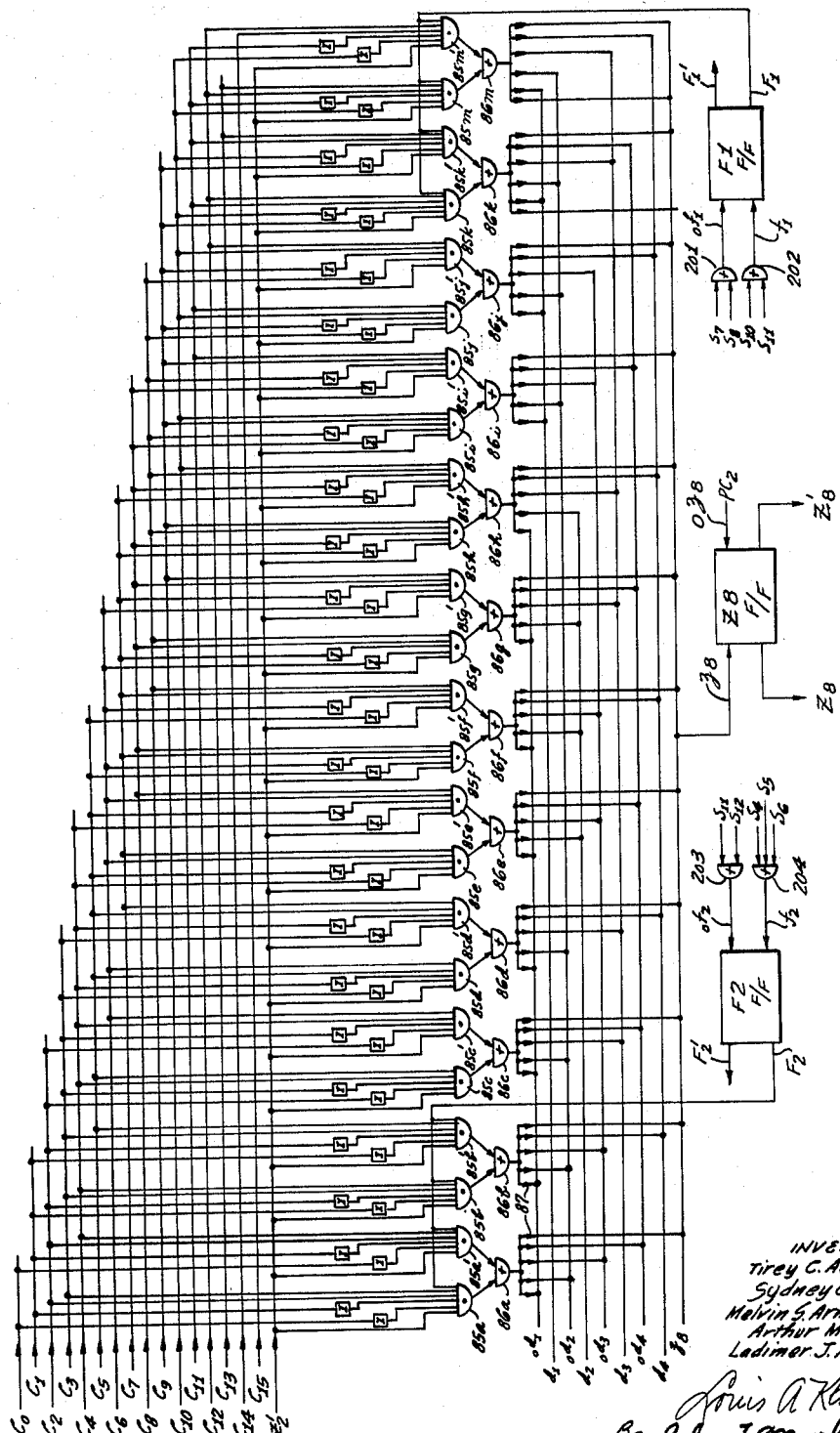

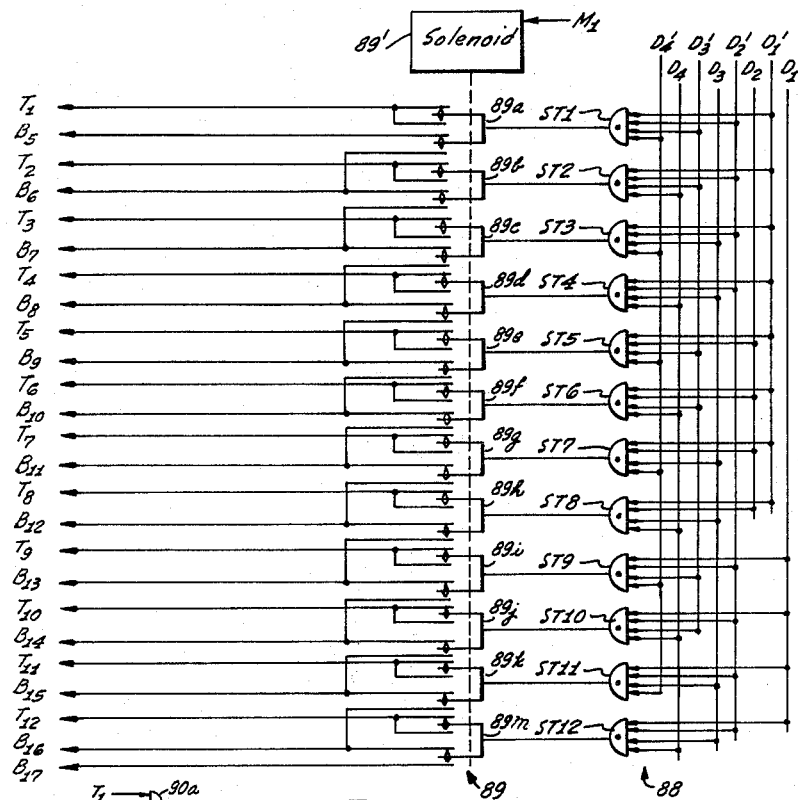
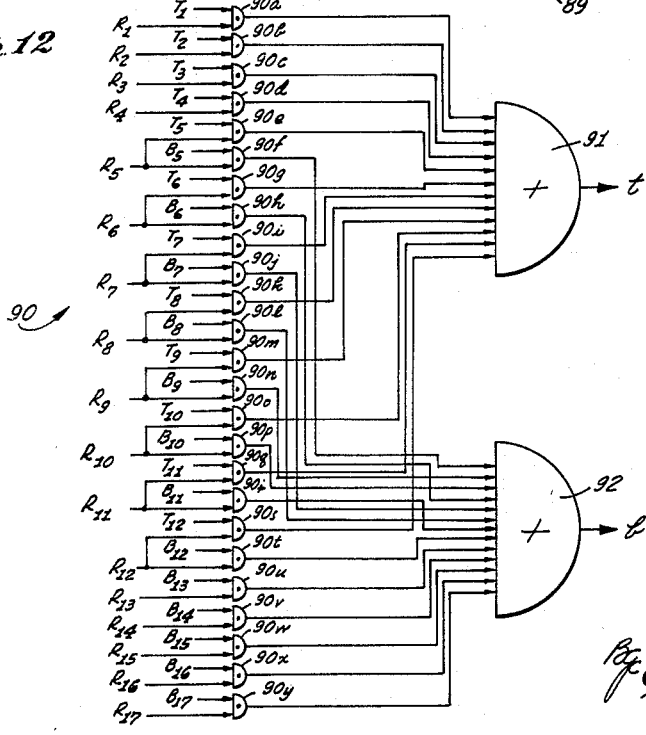

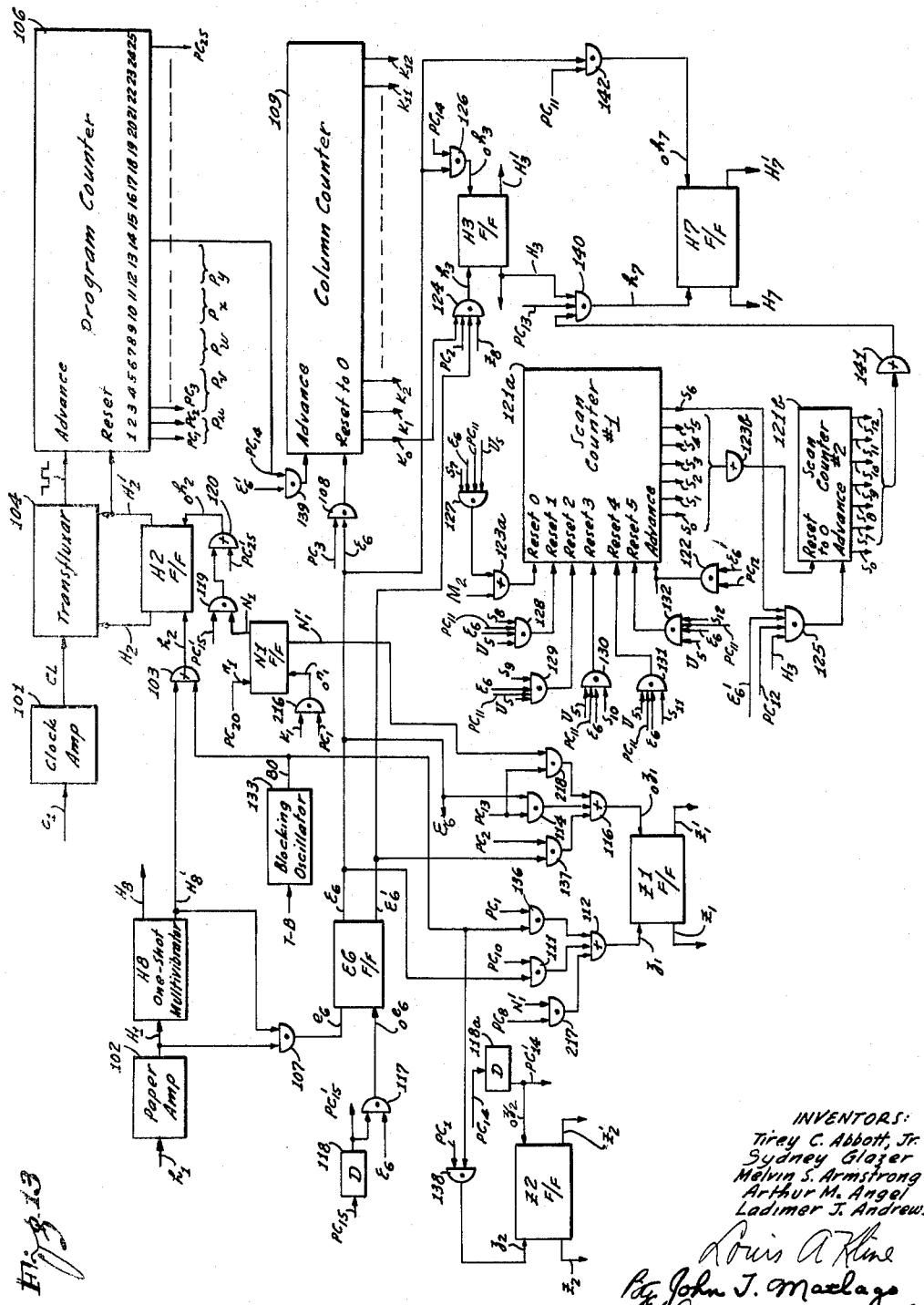

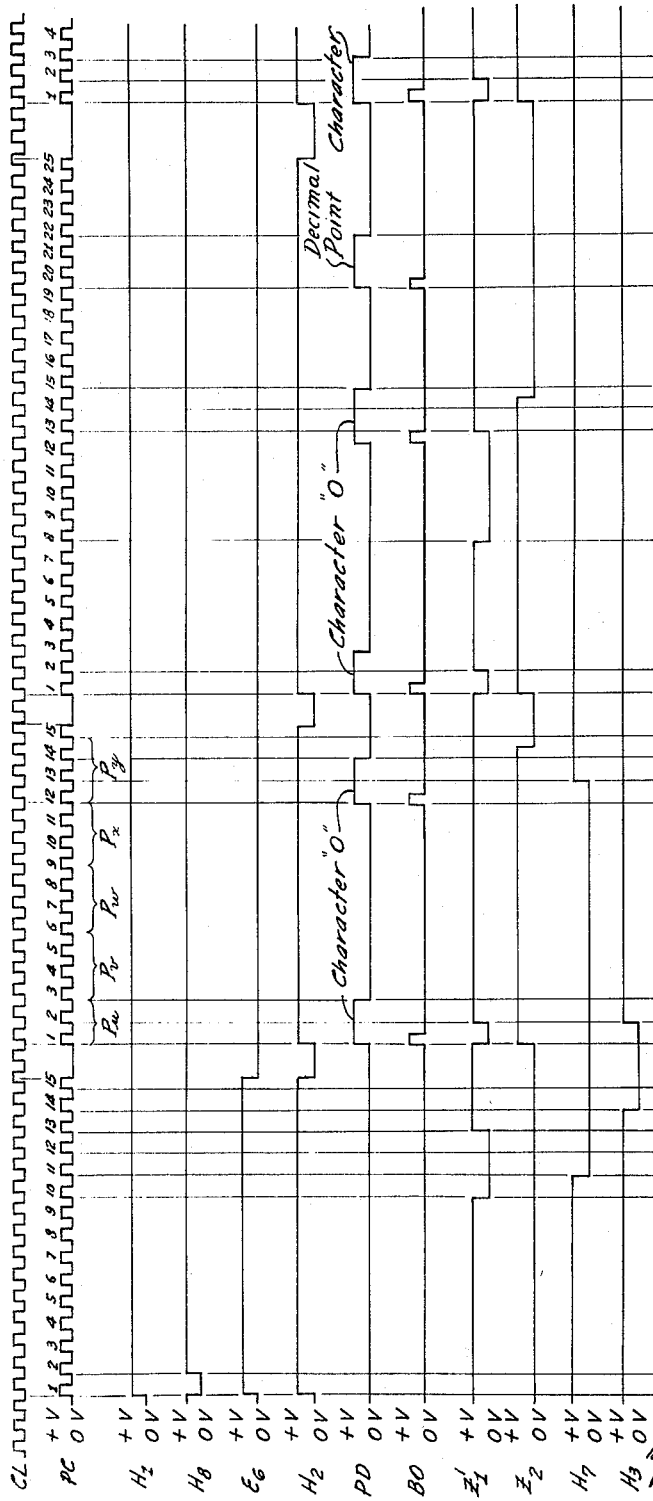

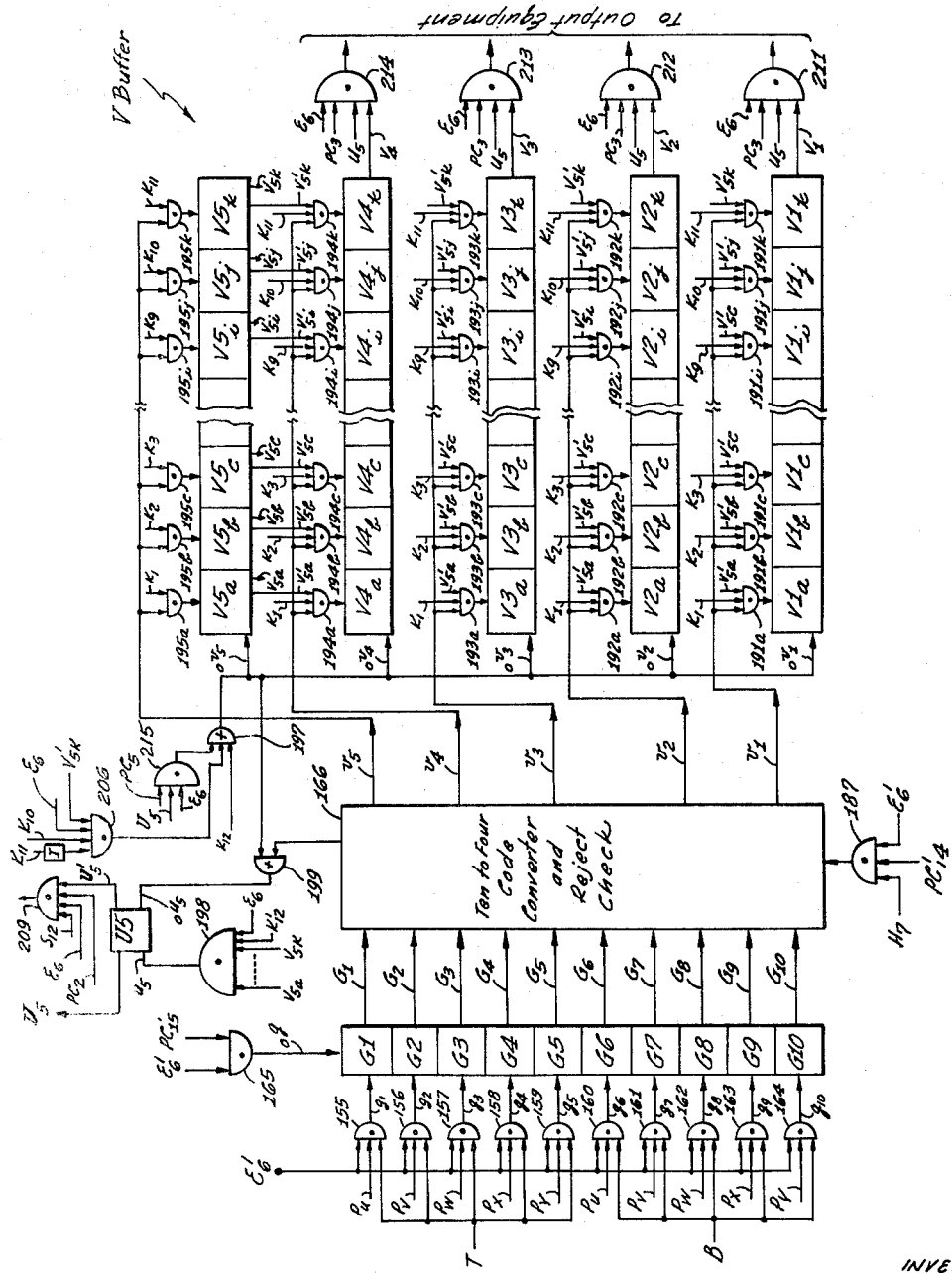

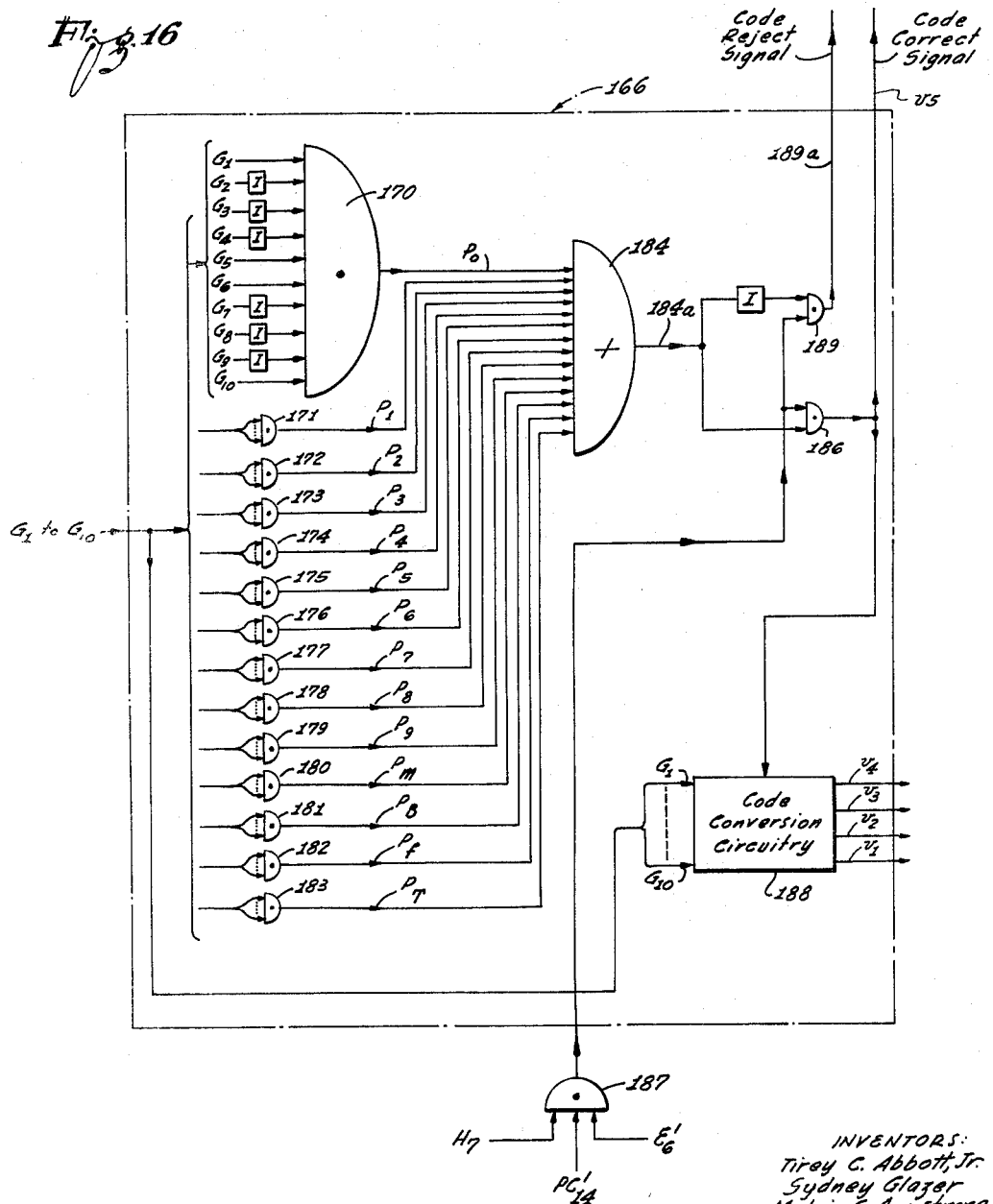

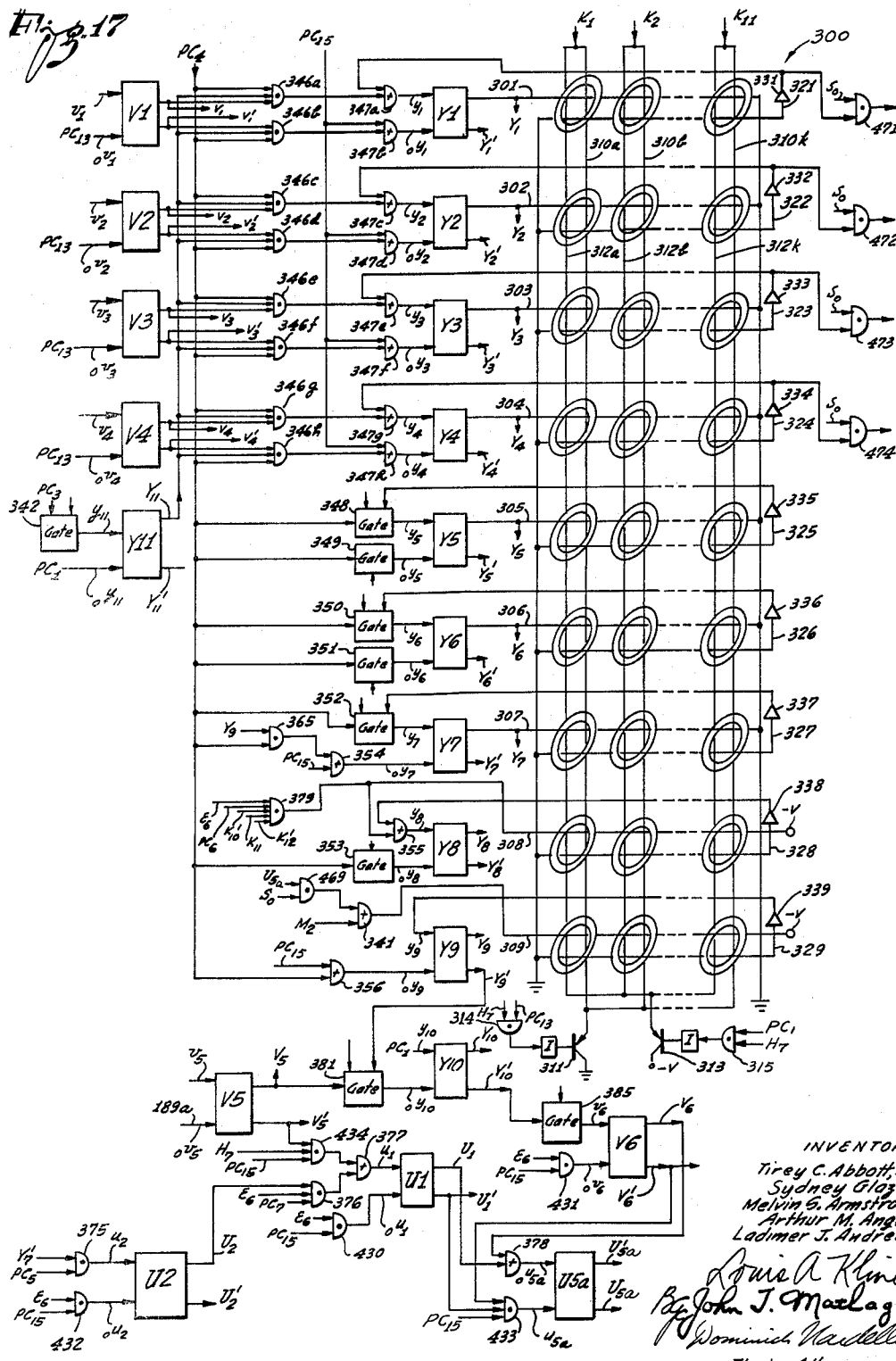

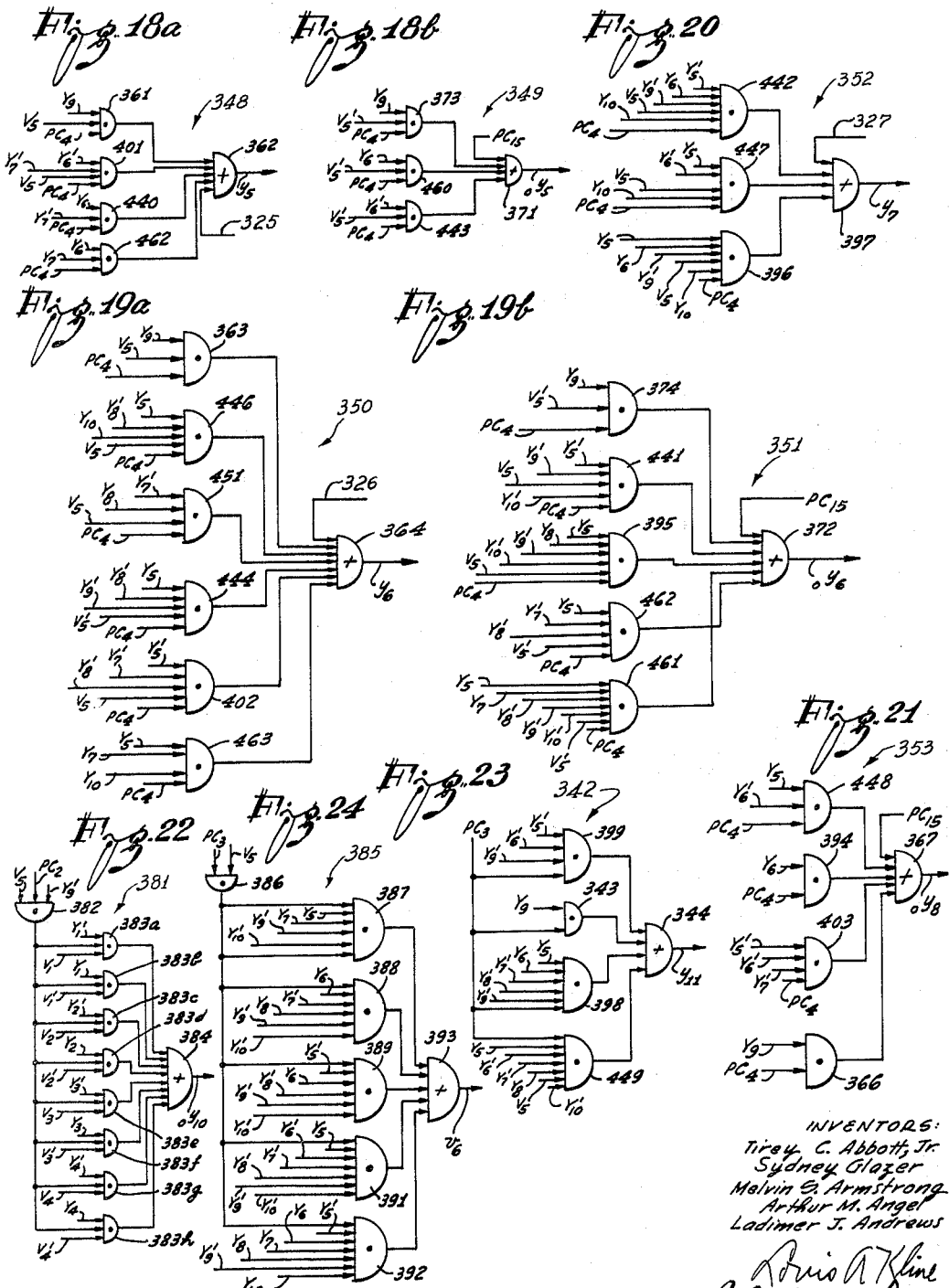

United States Patent Office 3,243,776
Patented Mar. 29, 1966

3,243,776
SCANNING SYSTEM FOR REGISTERING AND
READING CHARACTERS
Tirey C. Abbott, Jr., Manhattan Beach, Sydney Glazer, Los Angeles, Melvin S. Armstrong, Lomita, Arthur M. Angel, Rolling Hills, and Ladimer J. Andrews, Gardena, Calif., assignors to The National Cash Register Company, Dayton, Ohio, a corporation of Maryland
Filed Feb. 8, 1963, Ser. No. 257,261
22 Claims. (Cl. 340—146.3)

This invention relates generally to character recognition systems and, more particularly, to an improved December 23, 1959, now Patent No. 3,102,995, and high speed character recognition system capable of accurately and reliably reading relatively poor quality printed characters.

In a copending application Serial No. 861,469 filed assigned to the same assignee as this application a character recognition system is described. The system utilizes stylized characters which when viewed in their normal orientation are divided into a plurality of imaginary vertical zones and into imaginary upper and lower halves or portions. Each character is stylized or formed so that vertical marks appear in selected upper or lower portions of the imaginary vertical zones whereby segment marks in a different combination of selected zones are chosen for each character. Only certain combinations of selected zones are chosen to represent a required set of characters in a particular system such that if any other combination, not included in the set, is sensed, that character is rejected by the system. The characters, being printed in rows on a paper tape, are read with a scanning means having two spaced moving apertures disposed to scan in unison across the tape in a direction parallel to the rows of characters. As the tape is advanced past the scanning means, the first aperture of the scanning means senses the characters in a row. When the first aperture has sensed a particular character a predetermined number of times, the two apertures are in a position to scan paths across the upper and lower portions of the character, to thus read the character.

An advantage of the present invention over the above described copending application, Serial No. 861,469 is the flexibility provided in reading a row of characters, which characters have been printed with apreciable misregistration relative to each other in the row. As a row of such characters is being scanned the system can, during a single scan of such a row of characters, determine the vertical registration of each of the characters, in turn, with respect to a read station, and immediately following this determination of vertical registration for each of the characters, the system provides for automatically selecting from a plurality of read apertures the two read apertures that coincide with the upper and lower scanning paths for each of the characters. As a result, unlike in the aforementioned application, both vertical registration and reading of each of the characters, in turn, can be accomplished in the present invention during a single scan of the row of characters. Also, since only a single scan is required in the present invention for registering and reading a row of characters, other scans can be used for checking so as to improve overall system reliability.

Briefly, the present invention provides a read station having two parallel columns of very closely spaced apertures. Each column of apertures extends over a distance approximately equal to two character heights. One column of apertures, designated as the registration apertures, functions to provide information defining the vertical position of the character image with respect to the read station. This information is then employed to enable two apertures in the other column of apertures to read the character and to supply coded information representing the character to a character recognition unit.

More particularly, the present invention provides a scanning means such as a rotating mirror and a lens for sweeping and focusing an image of each character, in turn, first across the column of registration apertures, and then across the column of reading apertures. A logical circuitry means is provided in combination with the registration apertures, to selectively gate two spaced reading apertures which substantially coincide with the character's upper and lower scan paths, respectively. Means are also provided whereby the logical circuitry means can be readily adapted so that different font sizes can be read by selectively gating two reading apertures having different spacing therebetween to read the characters. An error checking logical circuitry is also provided wherein a row of characters is read and recorded in a buffer memory and the row is rescanned and reread a plurality of times. The readings of characters in a later scan of a row are compared with the readings of a previous scan that are recorded in the memory to determine if the characters are read correctly.

A principal object of this invention is to provide significant improvements in the character reading system disclosed in the aforementioned copending patent application Serial No. 861,469.

Another object of the present invention is to provide a character reading system capable of reliably reading characters that have been printed on ordinary stock paper with relatively poor quality and appreciable misregistration.

Another object of the present invention is to provide a character reading system in which characters are scanned in rows and improved means are provided for detecting the horizontal and vertical registration for each character in a row whereby all the characters in a row may be read during a single scan of the row irrespective of any misregistration of the characters in a row.

Another object of this invention is to provide a character reading system in which characters are scanned in rows by employing a read station comprising two parallel columns of light sensitive apertures and circuitry means interconnecting the two columns of apertures whereby information concerning the relative vertical position of each character, with respect to the read station, is first determined by the apertures in one column and this information is then employed to selectively gate two apertures in the second column of apertures for reading the character.

Another object of the present invention is to provide a character reading system wherein characters are read with improved speed, accuracy and reliability.

Another object of this invention is to provide a rotating mirror for sweeping a character image across a stationary read station having two parallel columns of light sensitive apertures.

Another object of this invention is to provide a character reading system wherein an image of a character is focused onto two read stations, each read station including two parallel columns of closely spaced light sensitive apertures and the read stations being shifted relative to each other such that their apertures read different portions of the image of each character, whereby accuracy and reliability in reading of the characters are increased.

Another object of this invention is to provide a means for comparing signals that are read on successive scans of the characters, and more particularly to compare signals generated during the reading of the characters in a scan with the reading of the character obtained during a previous scan to detect inconsistencies in the readings and the possibilities of error.

These and other objects and features of the invention will become apparent to those skilled in the art of disclosure is made in the following detailed description of a preferred embodiment of the invention illustrated in the accompanying sheets of drawings, in which:

FIG. 1 shows a plurality of typical stylized characters for use in an embodiment of a character reading system in accordance with the invention described herein;

FIG. 6a is a view of one read station and, in particular, of the registration and reading apertures, taken in the direction of arrows 6—6 of FIG. 4;

FIG. 6b is a view showing the apertures of both of the read stations of FIG. 4 superimposed one over the other together with exemplary images of characters sweeping past the apertures.

FIG. 8 is a partial section taken through line 8—8 of FIG. 7a;

FIG. 9 is a block diagram of the logical circuitry including the vertical registration flip-flops and the vertical registration memory flip-flops which circuitry enables two read apertures by which a character is read to be selectively gated, for each character, in turn, the character recognition unit.

FIG. 10 shows the logical circuitry for switching from the vertical registration flip-flops to the vertical registration memory flip-flops;

FIG. 11 shows the logical circuitry responsive to the registration memory flip-flops for providing the pair of signals for gating a selected pair of read apertures for reading a character;

FIG. 12 shows the switching network for supplying information read by the selected read apertures to the character recognition unit;

FIG. 13 is a block diagram of the timing and control logical circuitry for producing various signals to synchronize and control the logical operations in the character reading system;

FIG. 14 is a graph showing various signal waveforms as produced by the circuit of FIG. 13;

FIG. 15 is a block diagram of one embodiment of the character recognition unit and its associated buffer storage;

FIG. 16 is a schematic showing of the logical circuitry for producing a reject signal;

FIG. 17 is a block diagram of another embodiment of a buffer storage and of a logical circuitry by which information already stored in the buffer is compared with incoming information;

FIGS. 18a and 18b are schematics of two gates which feed the two inputs of information flip-flop Y5;

FIGS. 19a and 19b are schematics of two gates which feed the two inputs of information flip-flop Y6;

FIG. 20 is a schematic of a gate which feeds one of the inputs of information flip-flop Y7;

FIG. 21 is a schematic of gate which feeds one of the inputs of information flip-flop Y8;

FIG. 22 is a schematic of a gate which feeds one of the inputs of comparison flip-flop Y10;

FIG. 23 is a schematic of a gate which feeds one of the inputs of command flip-flop Y11; and FIG. 24 is a schematic of a gate which feeds one of the inputs of error-indicating flip-flop V6.

Like numerals designate like elements throughout the figures of the drawings.

Figure 2:
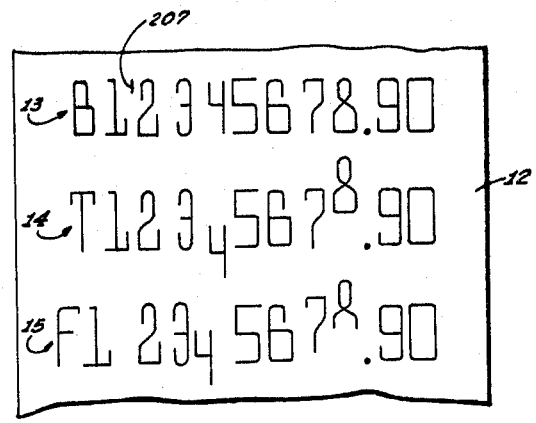
FIG. 2 shows a section of typical printed record medium having rows of stylized characters printed thereon.

Referring to the drawings in greater detail and to FIG. 1 in particular, fourteen stylized characters are illustrated, such as may be employed in a typical character reading system in accordance with the invention. As shown, ten numerical characters "0" through "9" and four alphabetical characters "F," "B," "T," and "M" are provided. Each character is divided into five vertical zones, respectively designated U, V, W, X, and Y, which zones contain character information in the form of vertical segments or lines used in forming the character. The lines in FIG. 1 designating the zones U, V, W, X and Y, are provided merely for illustrative purposes and do not appear on actual printed characters.

The horizontal lines in FIG. 1, designated as $t$ and $b$ passing through the top and bottom halves of each character, such as the character "0," indicate the two properly located scanning paths across zones U, V, W, X, and Y for which the presence or absence of a vertical segment in each zone is detected in order to obtain character information from which the character can be identified. If the presence of a vertical character segment in a zone is designated as a binary "1," and the absence of a character segment in a zone is designated as a binary "0," then when a character is scanned along the top and bottom paths $t$ and $b$, as indicated, a five digit binary code will be obtained for each path as shown below each character in FIG. 1. The two five digit binary codes thus obtained may be considered as a ten digit binary code. The stylizing of the characters in the system is such that a unique ten digit binary code is obtained for each character.

To prevent mistaking one character for another, the stylizing of the characters in the system is chosen to be such that at least two reading errors are required in order to misidentify a character, i.e., identify one character as another character in the system. For example, in scanning the character "0" in FIG. 1, if the vertical segment in zone U of the scan along the path $t$ were absent because of improper printing, the five digit binary code obtained for the top scan along path $t$ would be 10000 instead of 10001. An examination of the other characters in the system will reveal that there is no other character in the system having the five digit binary code 10000 for the top scan along path $t$ which also has the five digit binary code 10001 for the bottom scan along path $b$. An error of this type can be recognized and prevents the character to be mistaken for any other character in the system. It should be noted, for example, that in scanning the character "0" in FIG. 1, if, in addition to the vertical segment in zone U of the scan along the path t being absent because of improper printing, the vertical segment in zone Y of the scan along path b were also absent because of improper printing, these two reading errors would cause the character "0" to be mistaken for the character "5." As will be explained in the ensuing description, one embodiment of the present invention provides for even eliminating this type of error in the majority of situations by providing means for reading the same character a plurality of times and then providing means for comparing signals generated during a later reading of the character with the reading of the character obtained during a previous scan. Each character is stylized so that a vertical segment is provided in zone U in either or both of the paths t or b. This is done to permit accurate control of horizontal registration, as will hereinafter become evident.

Referring now to FIG. 2, a section of printed record medium, for example, a cash register tape 12, is shown having rows of stylized characters printed thereon, the stylizing being in accordance with FIG. 1. The first row of characters 13 shown on the tape 12 in FIG. 2 is typical of a complete row of characters in which no misregistration or printing errors in the characters are visibly noticeable. The second row 14 on the tape 12 in FIG. 2 illustrates a group of characters having vertical misregistration, the characters "4" and "8" being misaligned vertically, lower and higher, respectively. The other row of characters 15 on the tape 12, illustrates a situation where a portion of one of the characters, for example "8," is absent because of improper printing, and a situation where there is excessive spacing between characters "1" and "2," between "4" and "5." It should be understood that although the misregistrations are shown to occur in different rows they could all occur in one row. The manner in which these typical rows of characters in FIG. 2 are read in the system of the present invention will become evident from the typical embodiment of the invention to be described herein.

Figure 4:
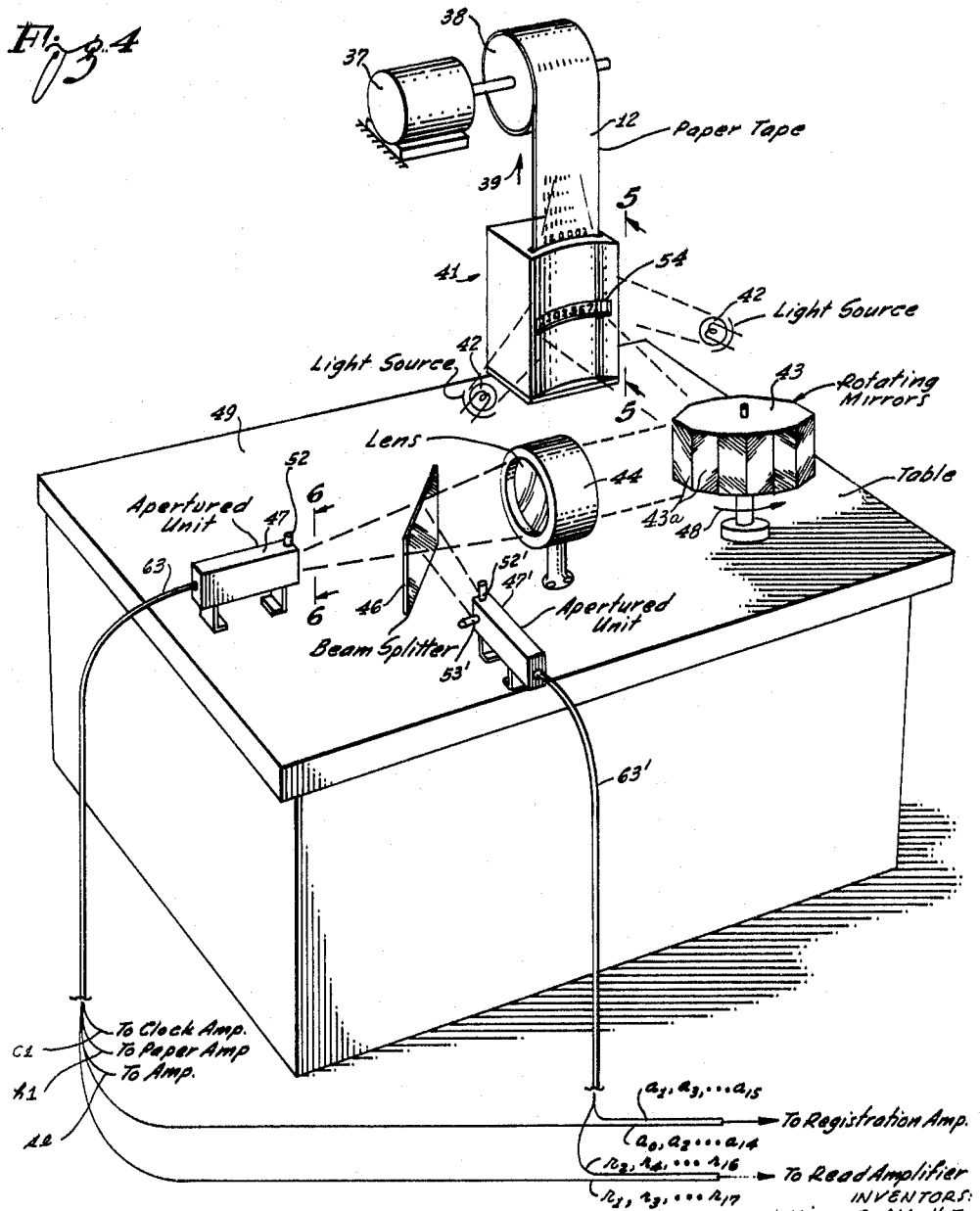
FIG. 4 is a pictorial view of the optical system of the present invention for scanning characters printed in rows on a paper tape.

Referring next to FIG. 4, a typical embodiment of a system for performing the reading of tape 12 of the present invention is shown pictorially. The tape 12 is shown moving upward, by suitable means such as drum 38 driven by motor 37, in the direction of arrow 39 past a window 54 provided at an observation station 41 that is illuminated by lamps 42, suitably positioned. The portion of the illuminated tape 12 as observed through the window 54 is reflected by one of the facets of a multi-facet rotating mirror 43 through a lens 44 past a beam splitter 46 and onto two separate reading stations 47 and 47'. The lens 44 is used to focus an image of the characters on each read station 47 and 47' and due to the beam splitter 46, which is a plane mirror intercepting only half of the light beam through the lens, the images on the read station 47 and 47' are the same. The rotating mirror 43 has, for example, twelve facets 43a, all of which are disposed parallel to the axis of rotation of mirror 43. The mirror 43 rotates in the direction of the arrow 48 causing the images formed by the lens 44 to sweep past the read stations 47 and 47'. The system is suitably mounted on a table 49, as shown.

Referring next to FIGS. 6a, 6b, 7a, and 7b, each read station, for example read station 47 (FIG. 6a), has a surface that is substantially normal to the light beam. The surface comprises plates 51a and 51b positioned on the end of housing 50. Plate 51a has a column of apertures including apertures c1, h1, and nine odd numbered read apertures r1 to r17, while plate 51b also has a column of apertures including aperture se and eight even numbered registration apertures a0 to a14. Plate 51a of read station 47 is fixed to housing 50, while plate 51b is slightly movable in two directions with respect to the housing 50 and is actuated to be repositioned within housing 50 by solenoids 52 and 53 shown suitably mounted on the wall of housing 50. The energization of armature 52a of solenoid 52 actuates plate 51b vertically within the prescribed limits as determined by the spacing between the upper edge of the plate 51b and the top wall of the housing 50. The energization of armature 53a of solenoid 53 actuates plate 51b horizontally within prescribed limits also as determined by the spacing between the right side edge of the plate and the right wall of the housing. As will be more clearly expalined in the ensuing description, when plate 51b is positioned down and against plate 51a, as when the solenoids 52 and 53 are not energized, a small size font of characters can be read. On the other hand, whenever solenoids 52 and 53 are energized by a suitable current from a power source (not shown), plate 51b is positioned up and away from plate 51a and a large font of characters can be read.

Figures 7A, 7B:
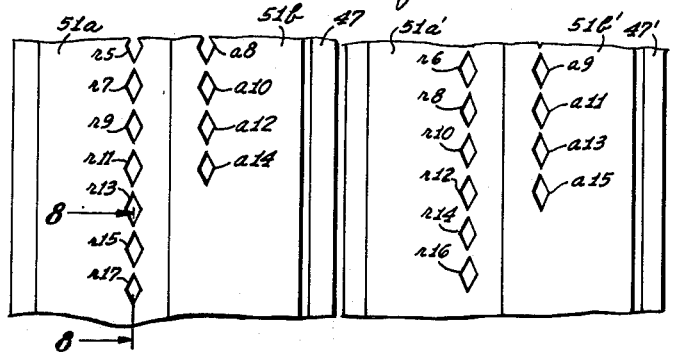
FIGS. 7a and 7b are partial views of the apertures at each of the read stations in FIG. 4 showing their relative position above the table; in particular, the apertures shown in FIG. 7a are the apertures enclosed within dashed lines 7—7 of FIG. 6a, and the apertures shown in FIG. 7b are those enclosed within a similar portion of the other read station.

The plates 51a' and 51b' of station 47', as shown in FIG. 7b, are identical to the plates of read station 47. It should be noted, however, that the vertical positions of the two read stations are different causing their apertures to overlap, as shown in FIG. 6b. In FIG. 6b, for purposes of illustrating the sensing action, the apertures are shown superimposed or overlapped over each other, but actually the apertures drawn by full lines, such as apertures c1, h1, and all the nine odd numbered apertures r1 to r17 are formed in plate 51a; and aperture se and the similarly drawn eight even numbered apertures a0 to a14 are formed in plate 51b, as shown in FIG. 7a. The remaining apertures drawn by dashed lines in FIG. 6b, such as the eight even numbered apertures r2 to r16, are formed in plate 51a'; and the similarly drawn eight odd numbered apertures, a1 to a15, are formed in plate 51b', as shown in FIG. 7b. The apertures are diamond shaped and have the advantage over other shaped apertures in that noise signals are substantially suppressed. In order to provide more accurate registration of characters with respect to the read station, a diamond shaped aperture, for example, aperture a9 of one plate 51b' is positioned so as to be sensing a character between two other diamond shaped apertures a8 and a10 of the other plate 51b. In the embodiment described the apertures are for example, .032 inch high and have a center-to-center spacing along the column of .0325 inch. The columns of apertures on one read station 47 are shifted vertically with respect to the corresponding columns of apertures of the other read station 47' by about .016 inch. Since the size of the small font characters is .130 inch high and .060 inch wide, the spacing between the two columns is .067 inch, which spacing is slightly more than the maximum character width. The size of larger font characters, which this embodiment is able to read, is .162 inch high and .080 inch wide. When the large font is to be read the solenoids 52, 52', 53, and 53' at read stations 47 and 47' are energized and plates 51b and 51b' are moved away from plates 51a and 51a', respectively, so that the spacing between corresponding columns at the read stations is now .090 inch, which spacing is more than the maximum character width of the large font. The plates 51b and and 51b' are moved up at the same time, a slight amount, in order to place the two read apertures of the column of read apertures in line with the scan paths t and b for the large font.

Figure 5:
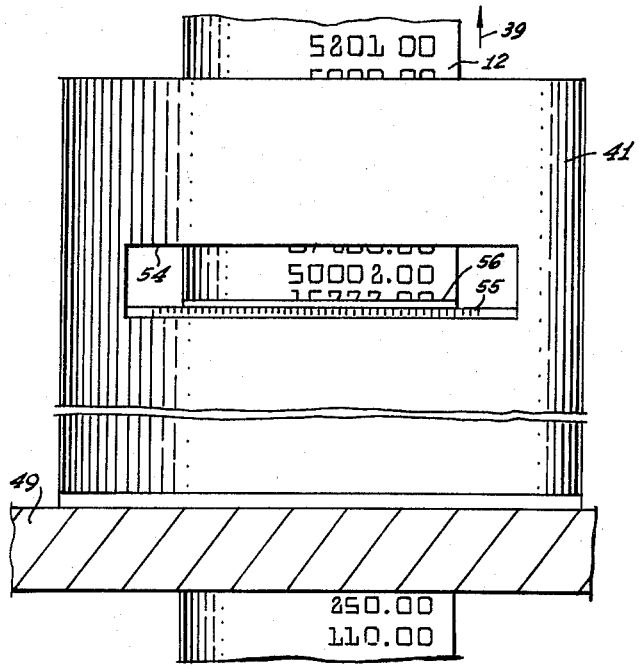
FIG. 5 is a view taken in the direction of arrows 5—5 in FIG. 4 showing an enlargement of the support for the printed record medium having exemplary printing thereon.

The observation station 41 is shown enlarged in FIG. 5 and, as mentioned before, the characters that are visible in window 54 are focused by the lens 44 and split by the beam splitter 46 to form an image of the characters onto each read station. At window 54 is located a row of clock marks 55 which are markings ten mils wide with ten mils spacing therebetween. Above the clock marks 55 is a white strip 56 whose function will be described hereinafter. The relative position between the observation station 41 and the read station 47 is such that, as shown in FIG. 6b, the images 55' of the clock marks 55 are swept by the rotating mirror across the aperture c1 in the direction of arrow 57 (FIG. 6b) while the image 56' reflected off the white strip 56 is swept across aperture $h1$. Then an inverted character image, as represented, for example, by the shaded "0," is first swept across some of the registration apertures $a0$ to $a15$ and then across some of the read apertures $r1$ to $r17$ in the direction of arrow 58. It is to be noted that since the tape 12 is moving very slow relative to the scanning rate in the direction of arrow 39, (FIG. 5) the character images in FIG. 6b are also moving in a direction normal to arrow 58 or in the direction of arrow 59 with respect to the aperture columns. Aperture $se$, being positioned above the aperture $a0$, senses the paper whiteness. The sensing by aperture $h1$ of white strip 56, whose length is equal to the width of tape 12, is used to detect the right hand leading edge of the tape 12, and to generate a signal equal to the width of the tape. The white strip 56 is used instead of the actual tape 12 because the trailing edge of any printing on the tape 12 may appear to the aperture as a leading edge of the tape and affect the timing of the system. Also if the characters are printed too close to the right hand edge of the paper, the white strip 56 can be extended to the right so as to be wider than the tape in order that sufficient time elapses between the time the aperture $h1$ senses the edge of the white strip 56 and the time the registration apertures sense the characters, as will be explained hereinafter.

Figure 8:
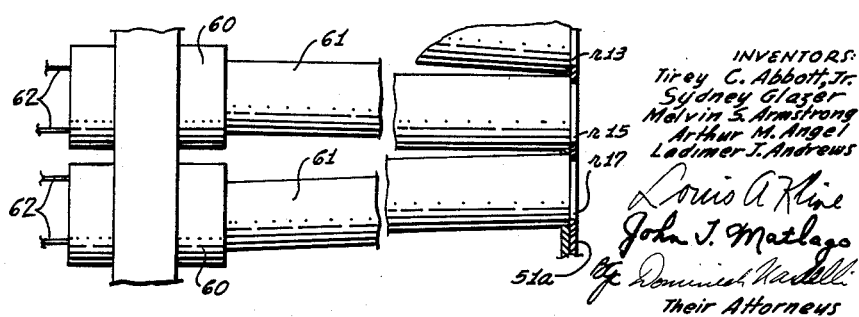

The variations in light intensity as determined by the shadows of the character images, as well as the other patterns, being swept across the apertures are detected by photodiodes 60 (FIG. 8) located respectively behind each of the apertures at read stations 47 and 47'. In the system described, the photodiodes 60 are considerably larger than the apertures at the stations 47 and 47'. Therefore, the photodiodes 60 are spaced from and behind the respective plates 51a, 51b, 51a' and 51b' in which the apertures are formed and glass rods 61 provide the required optical paths or light guides connecting each aperture with its respective photodiode 60. The variation in light intensity passing across the apertures is changed to electrical variations by the photodiodes. The variations are fed through leads 62 which are banded together to form cables 63 and 63' (FIG. 4). The cables 63 and 63' are coupled to suitable amplifiers and logic circuits as will be explained hereinafter.

The operation of the apparatus of FIG. 4 will now be described. When power is applied to the apparatus, the lamps 42 illuminate the observation station 41, motor 37 moves the tape 12 upwards, and the rotating mirror 43 rotates such that each facet 43a of the rotating mirror reflects the light it receives from the observation station 41. Because the mirror 43 is rotating, the rays of light beams reflected by the facets will rotate like the spokes of a wheel substantially about the axis of rotation of the mirror. The rotating rays passing through lens 44 are focused on the plates 51a, 51b, and 51a', 51b' of stations 47 and 47', respectively (FIGS. 7a and 7b). Aperture $c1$ at station 47, as mentioned, is located so that the images 55' of the clock marks 55 sweep thereacross as the mirror 43 rotates. Since the clock marks 55 are uniformly spaced on the observation station 41 the period of the electrical pulses that are formed by photodiode 60 behind aperture $c1$ will vary in accordance with the variation in the speed with which the clock mark images 55' pass over aperture $c1$. Inasmuch as the angular rotation of the light beam reflected from a mirror which is rotating on an axis spaced parallel to the reflecting surface is not constant, the edge of the window having clock marks 55 and also the tape 12 are oriented and formed into a concave surface by the observation station 41 as shown in FIG. 4 so that the variation in angular speed of the rotating light beam is preferably maintained within 4% between the time one end of the tape sweeps across the apertures and the time the other end sweeps thereacross.

As the paper indicator white strip 56 is focused on aperture $h1$, the photodiode that is coupled to aperture $h1$ forms a signal $H_1$ when the leading right hand edge of the image 56' formed by the strip 56 (FIG. 5) passes over the aperture, which signal is maintained until the image of the trailing left hand edge of the strip passes the aperture.

If a row of characters appears in the window 54 of the observation station 41, the rotating mirror 43 also sweeps the image of each character across the column of registration apertures and then across the columns of read apertures as shown by the inverted images of characters "0," "9," "2," and "5" (note that the images are inverted and reversed left to right by the lens 44) passing across the columns of apertures in FIG. 6b. The registration apertures $a0$ to $a15$ sense and register the vertical position of a character to select the appropriate two apertures in the column of read apertures that are in position to read the character, as will be described hereinafter.

Referring to FIG. 9, a block diagram is shown of a typical logical circuit for selecting the two read apertures to be gated to a character recognition unit 94. When the image of a character, for example, a small font character "0," which is 130 mils high, sweeps past the registration apertures $a9$ to $a15$ (as shown in FIG. 6b), the photodiodes 60, coupled to the respective registration apertures, form electrical impulses or signals that are related to the dark and light portions of the image. These impulses are fed on related leads $a_0$ to $a_{15}$ to an amplifier bank 81 to be individually amplified, by respective ones of the amplifiers A0 to A15 to form individual amplified signals $A_0$ to $A_{15}$ which are preferably of positive potential to indicate that a dark portion of the image passed across related apertures. In order to reduce noise in the system the aperture $se$ in plate 51b (FIG. 6a) senses the paper whiteness and this signal is fed to the amplifier bank 81 to adjust the gain of the amplifiers A0 to A15. The amplified signals $A_0$ to $A_{15}$ are each coupled to the true inputs of 16 individual flip-flops C0 to C15 which are assembled in a bank 82. Each flip-flop C0 to C15 is coupled to one of the amplifiers A0 to A15, respectively. Then when any one of the positive potential signals $A_0$ to $A_{15}$ is produced, a corresponding flip-flop C0 to C15, respectively, is switched true if it was false or remains true if it was already switched true. Hereinafter the two states of a flip-flop will be denoted as a true state or a false state (true or false) since the flip-flops are associated with a logical circuit. The signal representing the true state will be hereinafter designated without a prime following the signal, for example $C_0$, and the signal representing the false state will be designated with a prime, for example, $C'_0$. The signals are generally noted in upper case letters and the subscript on the signal generally indicates which flip-flop or which amplifier produced the signal while lower case letters and subscripts generally indicate input leads to flip-flops and amplifiers.

The flip-flops C0–C15 are initially switched to the false state by a signal $Z_1$. Then, only a group of the flip-flops are switched true when the image of a character sweeps past the registration apertures because a character image covers only a portion of the registration apertures, for example, the image of the small font character "0" in FIG. 6b covers only apertures $a2$ to $a10$. In this case only flip-flops C2 to C10 are switched true. Thus, the vertical position of the character image is located. This information is to be preserved during the time that that character is being read by the read apertures and the time that the registration flip-flops C0 to C15 are registering the position of the next character. A logic circuitry 83 that functions in response to outputs from the flip-flops C0 to C15 is provided to transfer information concerning the vertical position of that character to four vertical registration memory flip-flops D1 to D4. The logic circuitry 83 supplies input signals to selected false and true leads $_0d_1$ and $d_1$, $_0d_2$ and $d_2$, $_0d_3$ and $d_3$, $_0d_4$ and $d_4$ of memory flip-flops D1 to D4, respectively. For example, when a signal is applied on each lead $_0d_1$, $_0d_2$, $_0d_3$, and $_0d_4$, the respective flip-flops D1 to D4 are switched false, and when a signal is applied on each lead $d_1$, $d_2$, $d_3$, and $d_4$, the respective flip-flops D1 to D4 are switched true. The logic circuitry 83 passes signals to the true leads $d_1$ to $d_4$ and false leads $_0d_1$ to $_0d_4$ whenever a signal $Z'_2$ is fed thereto and, following this time, the signal $Z_1$ switches the flip-flops C0 to C15 false.

Referring to FIG. 10 a typical logic circuitry 83 is shown. The signals $C_0$ and $C_1$ are inverted by inverters I and then false signals $C'_0$ and $C'_1$ are coupled to the inputs of two AND gates 85$a$ and 85'$a$, respectively. AND gate 85$a$ has two other inputs coupled to signals $C_2$ and $C_3$ while AND gate 85'$a$ has two other inputs coupled to signals $C_2$ and $C_4$. The output signals of AND gate 85$a$ and 85'$a$ are coupled to the inputs of an OR gate 86$a$. Leads $_0d_1$, $_0d_2$, $_0d_3$, $_0d_4$, and $z_8$ are each coupled to the output of OR gate 86$a$ through diodes, such as diode 87, and conduct signals when one or the other AND gate is true. This part of the circuitry reacts when the character image is in the position covering apertures $a2$ to $a10$, as shown by the image of character "0" in FIG. 6$b$, because signals $C'_0$, $C'_1$, $C_2$, $C_3$, and $C_4$ are all positive. The false signals $C'_0$ and $C'_1$ are used to locate the upper edge of the character image. As an alternative, signal $C'_0$ could be eliminated from one of the inputs of AND gates 85$a$ and 85'$a$ and the upper edge of the character image could be determined but the circuit would be influenced by noise to a greater extent than the circuit shown in FIG. 11. As another alternative, AND gate 85'$a$ could be removed from the circuit but again the new circuit would be influenced by noise to a greater extent than the circuit shown. It should now be clear that the condition of the C0 to C4 flip-flops as fed to AND gates 85$a$ and 85'$a$ uniquely determines the vertical registration of a character image when it is in the position covering apertures $a2$ to $a10$, as shown by the image of character "0" in FIG. 6$b$. Having determined the vertical registration of the character, the two read apertures $r1$ and $r5$ which are in the proper position to scan paths $t$ and $b$ of the character "0" can now be selected and gated.

Because the images of the characters move down the registration apertures with each sequential scan of the row of characters as performed by the rotating mirror, the system next detects, for example, when the image of character "0" covers registration apertures $a3$ to $a11$ so that two different read apertures, which are now in the correct position to scan the character over paths $t$ and $b$, can be gated for reading the character. Therefore, two more AND gates 85$b$ and 85'$b$, having their outputs coupled to the inputs of another OR gate 86$b$, are supplied. The functions of AND gates 85$b$ and 85'$b$ and OR gate 86$b$ are similar to the function of AND gates 85$a$ and 85'$a$ and OR gate 86$a$, respectively. However, the inverse of signals $C_1$ and $C_2$ are applied to the inputs of AND gates 85$b$ and 85'$b$ while signals $C_3$ and $C_4$ are applied to the inputs of AND gate 85$b$ and signals $C_3$ and $C_5$ are applied to the inputs of AND gate 85'$b$. Now leads $_0d_1$, $_0d_2$, $_0d_3$, $_0d_4$, and $z_8$ will conduct signals whenever these conditions occur. Since the characters move continuously down the registration apertures during the scanning process by the rotating mirror 43, various combinations of apertures $a0$ to $a15$ would be covered by the character image, and AND gates 85$a$ and 85'$a$ to AND gates 85$m$ and 85'$m$ are able to detect which combination of apertures were covered and in turn apply signals to a different combination of four leads of the leads $_0d_1$, $d_1$, $_0d_2$, $d_2$, $_0d_3$, $d_3$, $_0d_4$, and $d_4$ to switch the flip-flops D1 to D4 and thereby select two other read apertures for providing read signals to unit 94. Whenever a character is in position to be read, or a signal is passed through any of the twelve OR gates 86$a$ to 86$m$, a signal is formed at lead $z_8$ which is coupled to a flip-flop Z8 that in turn produces true signal $Z_8$ (FIG. 10). At the fall of signal $PC_2$ this flip-flop is switched false to turn off signal $Z_8$. The presence of signal $Z_8$ indicates that a character is in a position to be read.

As mentioned above, the logic circuitry 83 transfers signals only when signal $Z'_2$ is present. Therefore signal $Z'_2$ is also fed to one of the inputs of each of the twenty-four AND gates designated 85$a$ to 85$m$ and 85'$a$ to 85'$m$. For reasons that will be explained hereinafter, a flip-flop F1 is provided having its true output signal $F_1$ coupled to AND gates 85$k$, 85'$k$, 85$m$ and 85'$m$ and a flip-flop F2 is also provided having its true output signal $F_2$ coupled to AND gates 85$a$, 85'$a$, 85$b$, and 85'$b$.

Referring again to FIG. 9, whenever a signal appears on false lead $_0d_1$, flip-flop D1 is switched false whereby a signal $D'_1$ is formed; conversely whenever a signal appears on true lead $d_1$, flip-flop D1 is switched true to form signal $D_1$. In turn, each of the flip-flops D2, D3 and D4 switches either true or false depending on which of its input leads is energized. Since there are four flip-flops D1 to D4, as many as 16 different combinations of four signals could be fed into a logic circuitry 88 (FIG. 11). Each of these combinations would indicate which of the registration flip-flops C0 to C15 were made true by the image of a character before the character is sensed by any two of the read apertures $r1$ to $r17$. Because the flip-flops C0 to C15 are all switched to the false state when the character that has been previously registered is first sensed by the read apertures, in order that the flip-flops C0 to C15 can register the position of the next character in the row, the function of the flip-flops D1 to D4 is to remember the vertical position of the character that was previously registered.

Although 16 combinations of four signals derived from the "D" flip-flops are available, only twelve of these combinations are used in the described embodiment. The logic circuitry 88 combines the different combination of four signals to form twelve signals $ST_1$ to $ST_{12}$ which are fed to relay circuit 89 (FIG. 11). The function of circuit 89 is to produce twelve different pairs of signals which are coupled to a switching network 90 to gate the correct two read apertures to the character recognition unit 94. Referring to FIG. 11, the logic circuitry 88 has twelve AND gates $ST_1$ to $ST_{12}$ with four inputs each and when each AND gate respectively passes a signal, signals $ST_1$ to $ST_{12}$ are formed. Signals $D'_1$, $D'_2$, $D'_3$, and $D'_4$ are fed to the inputs of AND gate $ST_1$; signals $D'_1$, $D'_2$, $D'_3$, and $D_4$ are fed to the inputs of AND gate $ST_2$; and signals $D'_1$, $D'_2$, $D'_3$ and $D'_4$ are fed to the inputs of AND gate $ST_3$; etc., as shown in the drawing. The outputs of each of the AND gates $ST_1$ to $ST_{12}$ are each fed to separate pairs of leads in the relay circuit 89. Relay circuit 89 has twelve double-arm relays 89$a$ to 89$m$. The function of the double arm is to divide each one of the signals $ST_1$ to $ST_{12}$ from the output of one AND gate, for example $ST_1$, into two signals $T_1$ and $B_5$. Thus, referring to the example of FIG. 6$b$, the character "0" as it sweeps across the read stations covers the registration apertures $a2$ to $a10$. As previously noted in FIG. 10, this causes flip-flops C2 to C10 to be switched into a true state. The outputs of these flip-flops pass a signal through AND gate 85$a$ and OR gate 86$a$ to switch flip-flops D1 to D4 into a false state. As shown in FIG. 11, this causes AND gate $ST_1$ to pass a signal to relay 88$a$ to provide signals $T_1$ and $B_5$. As further shown in FIG. 12, signals $T_1$ and $B_5$ open AND gates 90$a$ and 90$f$ to pass signals sensed by read apertures $r1$ and $r5$, respectively. This results in reading the character "0" along its scan paths $t$ and $b$. The relays 88$a$ to 89$m$ are actuated by a solenoid 89' so that when the solenoid is in the non-energized position the relays make contact as shown. Then, when solenoid 89' is energized by a suitable current $M_1$ (which may be supplied by the same power supply that energizes solenoids 52, 52', 53 and 53') the relays take their alternate position whereby, for example, the signal $ST_1$ is divided into signals $T_1$ and $B_6$ which are different than when the solenoid is not energized. In this embodiment, whenever current $M_1$ energizes the solenoid, the system is in position to sense correctly the large font characters, that were described above, and whenever current $M_1$ is removed from the solenoids the system is in a position to sense correctly the small font characters.

Referring to FIG. 12, the switching circuit 90 is shown to include twenty-five AND gates $90a$ to $90y$ having two input leads each. One lead of each AND gate is coupled to only one of the signals $T_1$ to $T_{12}$ and $B_5$ to $B_{17}$ from FIG. 11. The other input leads of the AND gates $90a$ to $90y$ have coupled thereto signals $R_1$ to $R_{17}$, as shown. Referring to FIG. 9, the signals $R_1$ to $R_{17}$, when present, are positive potential and are the amplified signals as produced by the photodiodes 60 coupled to apertures $r1$ to $r17$ which generate signals in response to the dark line segments of a character. Signals from the respective photodiodes 60 are fed to leads $r1$ to $r17$ of amplifiers R1 to R17, respectively. Amplifiers R1 to R17 are formed into an amplifier bank $81'$ which like amplifier 81, amplifies each signal separately to produce signals $R_1$ to $R_{17}$. Also in the preferred embodiment, each amplifier R1 to R17 has its clip levels set progressively higher for reasons to be described hereinafter. Signals $R_1$ to $R_4$ are coupled to AND gates $90a$ to $90d$, respectively; signals $R_{13}$ to $R_{17}$ are coupled to AND gates $90u$ to $90y$, respectively; and the signals $R_5$ to $R_{12}$ are each coupled to two AND gates, as, for example, signal $R_5$ is coupled to AND gates $90e$ and $90f$; signal $R_6$ is coupled to AND gates $90g$ and $90h$; etc. This is done because the respective read aperture $r5$ to $r12$ are in position where they can scan either the top scan path $t$ of a character or a bottom scan path $b$, depending on the vertical position of the character with respect to the column of read apertures. Depending on which one of the signals $T_1$ to $T_{12}$ and which one of the signals $B_5$ to $B_{17}$ are present, one of the AND gates $90a$, $90b$, $90c$, $90d$, $90e$, $90g$, $90i$, $90k$, $90m$, $90o$, $90q$, or $90s$ will pass signals corresponding to path $t$ which signals are fed to OR gate 91, and one of the other remaining AND gates will also pass signals but these signals, corresponding to path $b$, are fed to OR gate 92.

Referring again to FIG. 9, signals $t$ and $b$ are coupled to a peak detector amplifier bank 93 including two amplifiers T1 and B1 to form amplified signals T and B which are coupled to the character recognition unit 94 and which are also fed to an OR gate 96 whose output is coupled to the timing circuit shown in FIG. 13. The coded signals for the characters, after they are stored temporarily in unit 94, are fed to output equipment 97 for use as needed.

Having described how the system selects the electrical signals which should correspond to the character code as noted in FIG. 1, the operation related to how these signals are recognized will be now described. Referring to FIG. 13, a block diagram of one embodiment of a clock or timing circuit is shown. As mentioned before, aperture $c1$ (FIG. 6a) senses the images $55'$ of clock marks 55 (FIG. 5), and a photodiode 60 coupled to the aperture $c1$ by one of the light guides 61 produces clock signals. The signals are fed by a lead $c_1$ to a clock amplifier 101 where they are multiplied and amplified to produce amplified square wave clock signals CL having a square waveform as illustrated in FIG. 14. The period of clock signals CL is preferably 5 microseconds and the geometry of the system (FIG. 4) and the angular rotation of the rotating mirror 43 is such that 5 microseconds equals .005 inch (5 mils) across the tape 12. The clock signals are at a positive potential for 2.5 microseconds and are at ground potential for 2.5 microseconds. Then since the clock marks 55 are ten mils wide and spaced ten mils between marks, the frequency of signals fed to lead $c_1$ is multiplied by 4 in the amplifier 101 and so shaped to produce signals CL. The small font characters to be read are 60 mils wide and only 12 clock signals are needed to completely scan across each character. Even though, as mentioned, the scanning speed of the characters across the registration and read apertures inherently changes as the row is scanned from right to left, 12 clock signals will still be equal to 60 mils during the scan.

When the light image $56'$ reflected off the strip 56 (FIG. 5) first enters aperture $h1$ (FIG. 6b) the photodiode 60 coupled thereto produces a signal which lasts as long as aperture $h1$ sees the light of image $56'$. This signal is fed to a lead $h1$ to an amplifier 102 to produce the amplified waveform or signal $H_1$ (FIG. 14) which indicates that a reading process is being formed. The clock signals CL are present when signal $H_1$ is formed. The rise in waveform $H_1$ causes a one-shot multivibrator H8 to switch to its false state to form signal $H'_8$ to indicate that the leading edge of the tape 12 is in line with the read apertures. Waveform $H_3$ (FIG. 14) falls in phase with the rise in signal $H_1$. After a short interval, for example, 5 microseconds, one-shot H8 switches to its true state, forming, again, signal $H_8$. Signal $H'_8$ is fed to an OR gate 103 whose output is connected to a true lead $h_2$ of flip-flop H2 to switch it true and produce signal $H_2$ (FIG. 14) whose rise is in phase with the rise in signal $H'_8$. Signal $H_2$ is coupled to a transfluxer 104 whose function is to delay the phase of the clock signals CL to produce a series of program counter signals, the first signal of which is phased to start at the same time signal $H_2$ rises, and the signals all having the same frequency and shape as signals CL. The state of flip-flop H2 determines whether the clock is on or off or the series of program counter signals are formed or not.

The transfluxer 104 may be of the type as taught in U.S. patent application Serial No. 69,050 filed on November 14, 1960 and assigned to the same assignee as this application. Briefly, the transfluxor is an apparatus which automatically delays the phase of the clock signals by any desired amount, for example, until the rise of $H_2$, and maintains the phase delay as long as $H_2$ is high. The clock signals from the transfluxor are fed to a program counter 106 which forms signals $PC_1$, $PC_2$, $PC_3$, etc., consecutively, as long as the transfluxor supplies clock signals.

Signals $H'_8$ and $H_1$ are also coupled to an AND gate 107 whose output is coupled to lead $e_6$ of flip-flop E6, that indicates during what position of a scan the system is to look for characters. A signal passing AND gate 107 switches flip-flop E6 true, forming a signal $E_6$ which as shown in FIG. 14 is also in phase with signal $H_2$. Signal $E_6$ indicates that the system is not reading a character and is coupled to an AND gate 108 and when signal $PC_3$ is formed by counter 106 a column counter 109 is reset to zero to form signal $K_0$. Signal $E_6$ is also coupled to AND gate 111 with signal $PC_{10}$ whereby a signal is passed therethrough and through an OR gate 112 to lead $z_1$ of flip-flop Z1, switching it true to produce the signal $Z_1$ that is the inverse of signal $Z'_1$ (FIG. 14). The state of flip-flop Z1 determines whether the C flip-flops are all in the same state. Signal $Z_1$, as mentioned before, is used to set all the flip-flops C0 to C15 to the false state whereby they are ready to register the vertical position of the character image with respect to the registration apertures. Signals $E_6$ and $PC_{13}$ are coupled to an AND gate 114 which is in turn coupled to OR gate 116 and to lead $_0z_1$ to switch flip-flops Z1 false thereby forming signal $Z'_1$. When signal $Z'_1$ is present the flip-flops C0 to C15 will maintain their state as determined by respective signals $A_0$ to $A_{15}$, fed thereto, being true if a signal is produced, by a corresponding registration aperture and being false if a signal is not produced.

Signal $E_6$ is also coupled to an AND gate 117 with signal $PC'_{15}$ whereby AND gate 117 passes a signal to lead $_0e_6$ of flip-flop E6 to switch flip-flop E6 false. Signal PC′$_{15}$ is a short square signal, about 2.5 microseconds duration, and represents signal PC$_{15}$ delayed about 2.5 microseconds or one half a clock period. PC′$_{15}$ is formed by a suitable delay circuit 118.

Signal PC′$_{15}$ and a true signal N$_1$ as provided by the decimal point flip-flop N1 are fed to an AND gate 119, whose output is fed in turn to an OR gate 120 and in turn to lead $_0h_2$. A signal in lead $_0h_2$ switches flip-flop H2 false and false signal H′$_2$ prevents the clock signals from passing through the transfluxor 104. False signal H′$_2$ is also fed to the program counter 106 and resets it so that the counter 106 starts counting from PC$_1$ whenever clock signals are again fed from the transfluxor 104.

The system is also provided with a scan counter, preferably a #1 scan counter 121a, and a #2 scan counter 121b. One function of these scan counters is to prevent a row of characters that has been correctly read from being read a second time. The scans are recorded in #1 scan counter at the time that signals E$_6$ and PC$_{12}$ are formed. The signals E$_6$ and PC$_{12}$ are coupled to an AND gate 122 which is coupled to the advance lead of #1 scan counter 121a.

In the embodiment being described, the tape 12 is placed in the machine so that at the start of the reading process no characters are visible in window 54 (FIG. 5). At the same time the system is started, a signals M$_2$ is formed by the switch closing and is applied to an OR gate 123a to reset #1 scan counter 121a to S$_0$. Signals S$_0$ to S$_5$ from #1 scan counter 121a, being fed to an OR gate 123b, in turn resets #2 scan counter 121b to S$_0$. When signal E$_6$ is formed and the program counter 106 forms signal PC$_{12}$ the #1 scan counter 121a advances, for example, from S$_0$ to S$_1$. The #1 scan counter 121a is advanced every time the logical product of E$_6$ and PC$_{12}$ is formed until, for example, signal S$_6$ is formed, or six scans are made. During the time signal S$_6$ is present and if the first character in the row of characters is in position to be read, time signal Z$_8$ is formed by flip-flop Z8 (FIG. 10) as mentioned above. Signals Z$_8$, K$_0$, E′$_6$, and PC$_2$ are coupled to AND gate 124 which passes a signal to lead $h_3$ to switch flip-flop H3 true, forming waveform H$_3$ (FIG. 14). Signal H$_3$ is coupled to an AND gate 125 together with signals PC$_{12}$, E′$_6$, and S$_6$. The output of AND gate 125 is coupled to the "advance" input of #2 scan counter 121b whereby the counter 121b is advanced, for example, from signals S$_0$ to S$_7$. If flip-flop H3 is not true during the scan, scan counter 121a waits in S$_6$ until a scan is made which switches flip-flop H3 true before #2 scan counter is advanced to S$_7$. During the time signal S$_7$ is present in #2 scan counter 121b, a reading is formed by the system as will be explained hereinafter. If all the characters in a row are correctly read and stored in the character recognition unit 94 during scan S$_7$ the scan counter 121a is reset to S$_0$. For example, if a signal U$_5$, indicating a row was correctly read, was formed during scan S$_7$, the logical product of signals U$_5$, PC$_{11}$, E$_6$, and S$_7$ will open AND gate 127 to reset both scan counters to S$_0$. The scan counter now has to perform five additional scans before the system is able to read a row, to ensure that the row of characters that was correctly read is not reread. During the next scan and at the formation of signals E$_6$ and PC$_{14}$, AND gate 126 passes a signal to lead $_0h_3$ to switch flip-flop H3 false.

If signal U$_5$ is not formed during scan S$_7$, the #1 scan counter 121a is not reset and the #2 scan counter 121b is advanced to signal S$_8$ by signals H$_3$, PC$_{12}$, E′$_6$, and S$_6$, because signal S$_6$ is still high until #1 scan counter 121a is reset. The system in scan S$_8$ tries to read the same row of characters again. If the row is now correctly read during scan S$_8$, as indicated by signal U$_5$ being formed, signals U$_5$, S$_8$, PC$_{11}$, and E$_6$ open AND gate 128 and #1 scan counter 121a is reset to S$_1$ and scan counter 121b is reset to S$_0$. Now four additional scans must be formed to ensure that the row that was just read is not reread.

But if another scan is required to read the row of characters the scan signal S$_9$ is formed and then if the row is read correctly an AND gate 129 is gated open and #1 scan counter 121a is reset to signal S$_2$ and scan counter 121b is reset to S$_0$. Having completed scan S$_9$, since the row of characters are continuously moving up in window 54 only three additional scans are needed before the row that was read is no longer in a readable position. Again if during S$_9$ no correct reading was performed on the row, three more scans are attempted, namely, scans S$_{10}$, S$_{11}$ and S$_{12}$. If during any of these scans a correct reading is performed scan counter 121a is reset to S$_3$, S$_4$, and S$_5$, respectively, as signals S$_{10}$, S$_{11}$, and S$_{12}$ are coupled to AND gates 130, 131, and 132, respectively, with signals U$_5$, PC$_{11}$, and E$_6$. Every time #1 scan counter 121a is reset #2 scan counter 121b is reset to S$_0$ as signals S$_0$ to S$_5$ are fed to the OR gate 123b.

Signal S$_7$ is formed only when character images cover registration apertures between $a2$ and $a13$ because that is when signal Z$_8$ is formed. If the character image, during scan S$_7$ covers apertures $a2$ to $a10$ (as shown in FIG. 6) then during the next scan S$_8$ the same image will cover apertures $a4$ to $a12$. This happens because the tape 12 is moving at about 4.5 inches per second and the rotating mirror 43, which has 12 facets, rotates at about 700 r.p.m. Then in each consecutive scan the row of characters moves approximately .032 inch which is the center-to-center spacing between apertures at one read station. Then the number of scans that are provided, by which a row of characters may be read, are six. The #2 scan counter 121b will count from scan S$_7$ to S$_{12}$ during the time the system is trying to read a row of characters correctly, and every time a new scan is formed the row of characters moves .032 inch or two aperture positions wherein at scan S$_{12}$ the row covers apertures $a12$ and $a14$ and logic circuitry 83 passes a signal through AND gate 85$k$ and OR gate 86$k$. At the next scan after scan S$_{12}$ the same row of characters still moving two aperture positions between scans covers only aperture $a14$ on read station 47 and the logic circuitry 83 does not produce signal Z$_8$ in this vertical position of the character image, to indicate that the row is too high in the window 54. Due to misalignment of characters and mechanical imperfections in the system the characters may not move vertically approximately 32 mils for each scan. Therefore, apertures are placed 16 mils apart, and the function of the odd numbered registration apertures $a1$ to $a15$ in the other read station 47′ is to detect the vertical positions of the rows in between the positions just mentioned.

Having previously described the procedure as to how a row of characters on a tape having a plurality of rows is prevented from being reread and thereby producing an error, the procedure as to how a row of characters is decoded will now be described.

When the first character image of a row of characters is in position, such as the image of one of the characters "0" (FIG. 6b), whereby registration apertures $a2$ to $a10$ sense the image, the character image is in the first of the twelve possible positions whereby it can be read correctly. The logical circuitry as shown in FIG. 9 gates two read apertures to the amplifier 93. When any of the read apertures $r1$ to $r17$ sense the leading edge of the character either signals T or B, or both, are formed by the peak detector amplifier 93. Signals T and B are fed to an OR gate 96 whose output is fed to a one-shot blocking oscillator 133 (FIG. 13). A short impulse signal BO is formed (FIG. 14) and is coupled to OR gate 103 to switch flip-flop H2 true and the program counter 106 again produces waveform PC (FIG. 14). PC$_1$ is timed to correspond in space to approximately the center of the vertical segment in zone U (FIG. 1) passing the read apertures. If, however, a character such as "0" is being read, a signal BO will again be formed at PC$_{13}$ (FIG. 14) but this time flip-flop H2 is true and it does not change state. Again at the fall of signal $PC_{15}$ ($PC'_{15}$) flip-flop H2 is switched false as signal $N_1$ is also present at AND gate 119.

Signal BO is also fed to an AND gate 136 together with signal $PC_1$. The output of AND gate 136 is fed to the OR gate 112 to switch flip-flop Z1 true, and, in turn, flip-flops C0 to C15 are cleared or are all switched false. Flip-flop Z1 is switched false at $PC_2$ when flip-flop E6 is false as signals $E'_6$ and $PC_2$ are fed to an AND gate 137 which is coupled through OR gate 116 to lead $_0z_1$. Now the C flip-flops are ready to register the position of the character in the second column.

The signal BO, being also fed to the input of an AND gate 138 together with $PC_1$, and the output of AND gate 138 being fed to lead $z_2$, switches flip-flop Z2 true. The flip-flop Z2 is the transfer flip-flop that transfers information concerning the vertical position of the characters from the C flip-flops through the D flip-flops. As mentioned above when false signal $Z'_2$ is low, the logic circuitry 83 is prevented from switching flip-flops D1 to D4. Therefore, flip-flop Z2 is held in the true state during the time a character image passes over the read apertures $r1$ to $r17$. Flip-flop Z2 is switched false at the fall of $PC_{14}$ or signal $PC'_{14}$. Signal $PC'_{14}$ is determined by a delay network 118a which operates in a manner similar to network 118. Signal $PC'_{14}$ is used because at this time the first character image should have passed the read apertures and the next character image is about to be read by the read apertures, allowing time for the flip-flops D1 to D4 to switch in between the column of characters. As shown in FIG. 14 the program counter 106 starts to count every time the leading edge of a character is sensed and turns off after the character has passed by the read apertures which is at the time signal $PC_{15}$ is formed when reading the small font. The column counter 109 is used to keep track of the number of times the program counter 106 counts through the PC signals. The column counter 109 advances at signal $PC_{14}$, when signal $E'_6$ is present, as both signals are fed to an AND gate 139 to advance the column counter. At $E_6$ time the column counter is reset to $K_0$ at the formation of signal $PC_3$. Then every time signals $PC_{14}$ and $E'_6$ are formed the column counter advances consecutively from $K_0$ to $K_{12}$. Because there are 11 numerical characters in a row on the tape 12, one more column signal is available than there are rows of characters and this information is used by the system to detect a non-acceptable read.

As mentioned before, at the formation of the logical product formed by signals $K_0$, $PC_2$, $E'_6$ and $Z_8$ at AND gate 124 flip-flop H3 switches true. The true state of flip-flop H3 tells the system that the row is in a position where a reading can be attempted. Signal $H_3$ is coupled to an AND gate 140 whose output is coupled to lead $h_7$ of flip-flop H7. The true state of flip-flop H7 conditions the system to read the row into the buffer. This time is determined when a signal passes an OR gate 141, to whose inputs are fed signals $S_7$ to $S_{12}$ from #2 scan counter 121b, and also when signals $PC_{13}$ and $H_3$ are formed at AND gate 140. Flip-flop H7 switches true to form waveform $H_7$, as shown in FIG. 14. Flip-flop H7 switches false during the next scan at the formation of the logical product by signals $PC_{11}$ and $E_6$ as these signals are fed to AND gate 142.

Five more signals are formed to operate the character recognition unit 94 and these signals are $P_u$, $P_v$, $P_w$, $P_x$, and $P_y$. Signal $P_u$ is present during the time signals $PC_1$ and $PC_2$ are present; signal $P_v$ is present during signals $PC_3$, $PC_4$ and $PC_5$; signal $P_w$ is present during signals $PC_6$, $PC_7$ and $PC_8$; signal $P_x$ is present during signals $PC_9$, $PC_{10}$ and $PC_{11}$; and signal $P_y$ is present during signals $PC_{12}$, $PC_{13}$ and $PC_{14}$. Signal $P_u$ may be formed by a standard network (not shown) such as a flip-flop that is switched true at the rise of signal $PC_1$ and then is switched false by the rise of $PC_3$, then signal $P_v$ could be formed by another flip-flop that switches true at the rise of $PC_3$ and then is switched false at the rise of $PC_6$, etc.

Since signals $PC_1$ to $PC_{12}$ represent the width of a character, signal $P_u$ represents the half-width of vertical zone U (FIG. 1, signal $P_v$ represents the full-width of vertical zone V, etc.

As the first character in the row passes the read aperture, a ten bit G register in the character recognition unit 94 is filled with a code. Referring to FIG. 15, the ten bit G register includes ten flip-flops G1 to G10 each having input leads $g_1$ to $g_{10}$, respectively. When a signal is applied to any of the leads $g_1$ to $g_{10}$ the flip-flop coupled thereto is switched true. The flip-flops G1 to G10 are all switched false when a signal is applied to a lead $_0g$ that is common to all false leads of the flip-flops. Each lead $g_1$ to $g_{10}$ is coupled to the output of only one of ten AND gates 155 to 164, respectively. Each AND gate 155 to 164 has three inputs and signal $E'_6$ is fed to one input of each of the AND gates 155 to 164; signal T is fed to another input of each of five AND gates 155 to 159 and signal B is fed to another input of each of five AND gates 160 to 164. Then in order to gate the T and B signals as produced by the different vertical zones U, V, W, X, and Y of a character (FIG. 1), signal $P_u$ is fed to one input of each of AND gates 155 and 160, signal $P_v$ is fed to one input of each of AND gates 156 and 161, signal $P_w$ is fed to one input of each of AND gates 157 and 162, signal $P_x$ is fed to one input of each of AND gates 158 and 163, and signal $P_y$ is fed to one input of each of AND gates 159 and 164. After a character is scanned the flip-flops G1 to G5 contain the binary code of the top scan path $t$ of the character and flip-flops G6 to G10 contain the binary code of the bottom scan path $b$ of the character. For example, character "0" in FIG. 1 has the binary code 10001 for the top scan path $t$. If binary "1" is indicated by the true state of the flip-flops and binary "0" is indicated by the false state of the flip-flops, flip-flops G1 and G5 will be true and flip-flops G2, G3, and G4 will be false. Flip-flops G6 to G10 register the bottom scan path $b$ binary code and therefore flip-flops G6 and G10 will be true and flip-flops G7, G8, and G9 will be false. When character "9" (FIG. 6b) is registered in the flip-flops G1 to G10, flip-flops G1, G4, G6 and G9 will be true since both the top and bottom portions of the character have markings in only zones U and X. The flip-flops G1 to G10 are all switched false at the beginning of a character reading by feeding signals $E'_6$ and $PC'_{15}$ to AND gate 165 which has its output coupled to lead $_0g$.

As was mentioned previously, each of the characters in the system is stylized to have at least one vertical segment in either or both paths $t$ and $b$ in vertical zone U. Thus, accurate horizontal positioning of the zones U, V, W, X, and Y is obtained because the program counter 106 is started when the center of vertical segment in zone U is sensed and this segment is presumed to be in the center of zone U.

Having filled the ten bit G register and in particular flip-flops G1 to G10, the code is next checked for reject and if not rejected is converted to a smaller binary code. The true leads of flip-flops G1 to G10 are coupled to a ten to four code converter 188 and a reject check circuit included in circuit 166. One function of the circuit 166 is to compare the ten bit binary code in flip-flops G1 to G10 with all the allowable ten bit binary codes that the system is using and as shown in FIG. 1. If the binary code in flip-flops G1 to G10 compares with one of the fourteen ten bit binary codes, the ten bit binary code in the flip-flops is converted to a four bit binary code which is the other function of the circuit 166. The reason for converting to a smaller binary code is to decrease the size of the V storage buffer.

Referring to FIG. 16, a typical embodiment of circuit 166 is illustrated, showing in particular, the logical circuitry by means of which one of two signals are produced, one to indicate a reject or no comparison and another to transfer the converted four bit code to the V buffer. The comparison is made by feeding the signals $G_1$ to $G_{10}$ as obtained from the true output of flip-flops G1 to G10 to each of fourteen AND gates 170 to 183, each such AND gate forming the logical product of a ten bit binary code representative of a respective one of the characters in the system. For example AND gate 170 forms the product of the ten bit binary code corresponding to character "0," inverters I being used to invert the appropriate signals $G_1$ to $G_{10}$. As seen in FIG. 1 the character "0" is represented by flip-flops G1 to G10 being set to the ten bit binary code 1000110001, the first five binary digits respectively corresponding to a scan of zones U, V, W, X and Y along path $t$ and the last five digits respectively corresponding to a scan of zones U, V, W, X and Y along path $b$. Thus, by inverting signals $G_2$, $G_3$, $G_4$, $G_7$, $G_8$ and $G_9$ before they are applied to AND gate 170, the output of AND gate 170 will be true and produce signal $P_0$ only if signals $G_1$ to $G_{10}$ are set in accordance with the character "0." In a similar manner, inverters (not shown) are appropriately provided in particular ones of the inputs of AND gates 171 to 183 so that each will correspond to a respective one of the other characters in the system (FIG. 1). As a result only one output $P_0$, $P_1$, $P_2$, $P_3$ ... $P_T$ of AND gates 170 to 183, respectively, will be true when $G_1$ to $G_{10}$ are set to the character in the system whose product is formed by the AND gate respectively corresponding to the character, the subscripts of the "P" outputs indicating the particular character in the system whose product is formed by each respective AND gate.

The fourteen signals $P_0$ to $P_T$ thus derived are each fed to an OR gate 184, whose output 184a is in turn fed to an input of an AND gate 186 along with a signal that passes through an AND gate 187. The signal from the AND gate 187 is the logical product formed by signals $H_7$, $PC'_{14}$, and $E'_6$ which indicates, as will be explained hereinafter, that the ten bit binary code is ready for reject checking. Since the output 184a of OR gate 184 is true only when signals $G_1$ to $G_{10}$ represent a character of the system and since the output of AND gate 187 is true only at the time a character is presumed to have been read, the output of AND gate 186 is true only when a character has been correctly read as a character in the system.

The output lead $v_5$ of AND gate 186 is coupled to a code conversion circuit 188 which converts the ten bit binary number to a four bit binary number when the output of AND gate 186 is true. The code conversion circuitry 188 may be of any conventional design. The signals forming the four bit number are coupled from the conversion circuit 188 through four leads $v_1$ to $v_4$.

The signal from output of OR gate 184 also is fed to an inverter I whose output is fed to one input of AND gate 189 with the output of AND gate 187 fed to the other input thereof. Then at the time that a character is presumed to have been read and it was not, the output lead 189a of AND gate 189 is true indicating a reject and the code conversion circuit is inhibited.

Now that the system has rejected all the ten bit binary codes that do not match a character which the system is using, the characters not rejected are stored in the V buffer.

The V buffer is large enough to store all the characters in one row. After the system scans a complete row and tries to read each character, a check is made of the V buffer to see whether the correct number of columns are stored therein. During a scan, if the first character in a column covers register apertures $a7$ to $a15$, any of the other characters in the row can be vertically misaligned to the extent that a misaligned character covers apertures $a2$ to $a10$ in one direction, and to the extent that another misalinged character covers apertures $a12$ to $a15$ in the other direction. The zone between these two limits is denoted as the reading zone of the read station. Under these conditions the system will read the row of characters even though their relative misregistration is as much as 50% from their normal vertical registration. If, however, the first character in a row covers apertures $a2$ to $a10$ all the characters that follow and are misregistered vertically higher on the read station (FIG. 6b) may require one or more additional scans before they will move down into the reading zone in which they can be properly read. The system incorporates a feature wherein an improperly printed character for example, that could not be read in one scan can be read in a succeeding scan. Referring again to FIG. 15, the V buffer includes 44 flip-flops, V1a to V1k, V2a to V2k, V3a to V3k and V4a to V4k which store the codes for the eleven characters in a row and also includes eleven flip-flops V5a to V5k which indicate which columns of the buffer are filled by an accepted code. Leads $v_1$, $v_2$, $v_3$, and $v_4$ feed the signals from the circuit 188 (FIG. 16) to the V buffer. Lead $v_1$ feeds signals to one of the inputs of eleven AND gates 191a to 191k, one for each flip-flop V1a to V1k. Leads $v_2$, $v_3$, and $v_4$ are similarly fed to eleven AND gates 192a to 192k, 193a to 193k, and 194a to 194k, respectively. Lead $v_5$ from AND gate 186 (FIG. 16) feeds a signal to one of the inputs of eleven AND gates 195a to 195k.

The output of each AND gate 191a to 191k is fed to the true inputs of the eleven flip-flops $V1_a$ to $V1_k$, respectively. Likewise the outputs of AND gates 192a to 192k are fed to the true inputs of eleven flip-flops $V2_a$ to $V2_k$; the outputs of AND gates 193a to 193k are fed to the true inputs of eleven flip-flops $V3_a$ to $V3_k$; outputs of AND gates 194a to 194k are fed to the inputs of eleven flip-flops $V4_a$ to $V4_k$; and outputs of AND gates 195a to 195k are fed to the true inputs of eleven flip-flops $V5_a$ to $V5_k$. All 55 flip-flops $V1_a$ to $V1_k$, $V2_a$ to $V2_k$, $V3_a$ to $V3_k$, $V4_a$ to $V4_k$, and $V5_a$ to $V5_k$ have their false leads, represented by leads $_0v_1$, $_0v_2$, $_0v_3$, $_0v_4$, and $_0v_5$, coupled to the output of an OR gate 197.

When the signal from AND gate 186 (FIG. 16) gates the code conversion circuitry, a high potential signal representing a binary "1" or a low potential signal representing a binary "0" appears in the leads $v_1$ to $v_4$ to represent a four bit binary code. As 16 possible four bit binary combinations are possible, this embodiment only uses 14 out of the 16 four bit binary combinations. At the same time the code correct signal appears in lead $v_5$. If the four bit binary code represents the character in the first column, the column counter 109 (FIG. 13) forms signal $K_1$. Signal $K_1$ is fed to one of the other inputs of five AND gates 191a, 192a, 193a, 194a, and 195a and flip-flops $V1_a$, $V2_a$, $V3_a$, $V4_a$, and $V5_a$ are switched true if a high potential signal appears on any of the respective leads $v_1$ to $v_5$. Flip-flop $V5_a$ switches true to indicate that an acceptable read has been made for column one ($K_1$) and that the flip-flops $V1_a$ to $V4_a$, representing column one, are storing a character. As seen in the drawing, AND gates 191a, 192a, 193a, and 194a have also coupled to one of their input leads the false state of flip-flop $V5_a$ or signal $V'_{5a}$. Then when signal $V'_{5a}$ is present, no character is stored in column one position of the V buffer. Similarly the flip-flops with the $b$ subscript will store the character of the second column position, etc. When all the column positions in the V buffer are filled with characters, a flip-flop U5 is switched true when the logical product formed on the output of AND gate 198 by signals $K'_{12}$, $V5_a$ to $V5_k$ and $E_6$ is fed to input lead $u_5$ of flip-flop U5. When flip-flop U5 is true a row of characters is presumed to have been read and the true signal $U_5$ is fed, as mentioned above, to each of six AND gates 127 to 132. Then, depending on which scan signal $S_7$ to $S_{12}$ is present, the #1 scan counter 121a will be reset accordingly and the #2 scan counter 121b will be reset.

As mentioned above, if the first character of the row of characters to be read happens to be at the vertical position whereby registration apertures $a2$ to $a10$ are covered and the scan counter 121b is in scan $S_7$, the #1 scan counter 121a is reset to $S_0$. At the next scan, signal $S_1$, the first character of the row just read, moves down to cover apertures $a4$ to $a12$; at signal $S_2$ apertures $a6$ to $a14$ are covered by the first character of the row; at signal $S_3$ apertures $a8$ to $a15$ are covered; at signal $S_4$ apertures $a10$ to $a15$ are covered; at signal $S_5$ apertures $a12$ to $a15$ are covered; and at signal $S_6$ apertures $a14$ and $a15$ are covered. If the first character in the next row is too high on the registration apertures whereby apertures $a0$ to $a8$ are covered by the character, flip-flop H3 remains false. Scan counter 121a remains at signal $S_6$ until this first character in the new row is in position to be read and that is until it covers apertures $a2$ to $a10$, or lower position apertures on the read station. Since the system disregards very large character misregistrations, this next row at the formation of signal $S_6$ by #1 scan counter 121a may cover apertures $a2$ to $a10$, in which event flip-flop H3 is switched true immediately to form a signal $S_7$ at #2 scan counter 121b. Signal $S_7$ passes through OR gate 141 to make the output of AND gate 140 true at signal $PC_{13}$ and flip-flop $H_7$ is switched true whereby the row can now be read.

However, during the reading of a row of characters, if at least one of the characters in the row is not recognized as a legitimate ten bit binary code, as represented in FIG. 1, and as mentioned before, a reject signal is formed on lead 189a and one of the V5a to V5k flip-flops is not switched true indicating that a legitimate code is not stored in the corresponding column position in the V buffer. This condition may occur, for example, when any character in a row is misprinted or is out of the reading zone of the read station, remembering that the upper portion of the character as viewed in FIG. 6a must lie between apertures $a2$ and $a13$ in order for the character to be within the reading zone. For example, in reading a character in a row which produces reject signal, after the character in the first column is read and its ten bit binary code is placed in the ten bit G register comprised of flip-flops G1 to G10, then a reject check is made of this reading in circuit 166, and, assuming the code is not rejected, it is stored in flip-flops $V1_a$, $V2_a$, $V3_a$, and $V4_a$. Flip-flop $V5_a$ at the same time is switched true. Now assume the character in the second column is misaligned, like the character "8" is in row 14 of FIG. 2, so that the image is positioned above the aperture $a2$. This character is not in position where it will be read correctly. But the flip-flops D1 to D4 maintain the same state they were in for the previous character and a signal formed by reading the character's top portion (as characters are inverted on the read stations) would pass through amplifier T1 of network 93 to turn on the transfluxor 104 and progem conuter 106. Then at signal $PC'_{14}$ a legitimate ten bit code would not be in the G register comprised of flip-flops G1 to G10 and a reject signal would pass through AND gate 189 and lead 189a (FIG. 16) and fed through OR gate 199 and lead $_0u_5$ of error flip-flop U5 to switch it false, if not already false. Since this is the second column, signal $K_2$ is present, but flip-flop $V5_b$ does not switch true as here again there is no signal present in lead $v_5$. Now even if the remaining characters are read correctly, since the flip-flop $V5_b$ is false, the logical product formed in AND gate 198 by signals $V_{5a}$, $V_{5b}$, $V_{5c}$, ... $V_{5k}$, $K'_{12}$, and $E_6$ is zero, since $V_{5b}$ is zero. Therefore, no signal passes through AND gate 198 and flip-flop U5 remains false. Since the characters are moving down the light sensitive apertures (FIG. 6b), the system tries to fill in the missing character code in the second column on the next scan $S_8$. On this next scan $S_8$ the first column is again read and, if the character code is not rejected, signals appear on appropriate leads $v_1$ to $v_4$. These signals do not pass through AND gates 191a, 192a, 193a, and 194a, respectively, since signal $V'_{5a}$ is low in potential as flip-flop $V5_a$ is true. The second column is next read during scan $S_8$. The character in this second column was not in position to be read on the previous scan but since the row has moved down the registration apertures, the character may be in a position to be read at this scan if the misalignment is not too large. The column counter 109 forms signal $K_2$, as described above. Since flip-flop $V5_b$ is false, AND gates 191b to 194b are open and if the character is not rejected the correct binary code is placed in flip-flops $V1_b$ to $V4_b$. Flip-flop $V5_b$ is also switched true. The remaining characters in the row are again read but do not affect the column positions in the buffer unless their corresponding V5 flip-flops are false. Then at the beginning of the next scan $S_9$, at signal $E_6$, AND gate 198 is open and flip-flop U5 is switched true, and, as AND gate 128 (FIG. 13) passes a signal, counter 121a is reset to $S_1$.

If again during this scan $S_8$ the character in the second column is not readable and therefore rejected, flip-flops $V5_b$ and U5 remain false. At the next scan, signal $S_9$ appears in scan counter 121b, and the system tries to place the missing character in its right column position in the V buffer which, in this example, comprises the four flip-flops $V1_b$ to $V4_b$. If the V buffer is filled this time, counter 121a is reset to $S_2$.

Thus, as more and more scans are needed to fill the buffer, the row of characters moves further down the registration apertures. Then by resetting #1 scan counter 121a to the various reset levels, less idling time is provided before the system tries to read the next row of characters. For example, if the system fills the buffer during scan $S_{12}$ the #1 scan counter 121a is reset to $S_5$. Then at the formation of signal $PC_{12}$ the #1 scan counter 121a is advanced to signal $S_6$ and, at the formation of signals $E'_6$ and $PC_{12}$, signal $S_7$ is formed if flip-flop H3 is true. To make sure that a misalignment in the previous row (such as the inverted image of character "5" in FIG. 6b) does not interfere with the logic of the flip-flops D1 to D4, signal $S_7$ from #2 scan counter 121b is fed to the false lead $_0f_1$ of flip-flop F1 (FIG. 10) through an OR gate 201 and switches it false. The AND gates 85k, 85'k, 85m and 85'm are inhibited as true signal $F_1$ is also fed to the inputs. To make sure that these AND gates are inhibited for larger misalignments, signal $S_8$ is also fed to the input of OR gate 201. AND gates 85k, 85'k, 85m and 85'm are turned on when either signals $S_{10}$ or $S_{11}$ is formed as these signals are fed to OR gate 202 and to lead $f_1$ of flip-flop F1.

Conversely, when the row that is being read is low on the registration apertures, signals $S_{11}$ and $S_{12}$ are fed to an OR gate 203 and to the false lead $_0f_2$ of a flip-flop F2 to switch it false. Then AND gates 85a, 85'a, 85b, and 85'b are inhibited as the true signal $F_2$ is coupled to the input of these AND gates. Flip-flop F2 is switched true by either signal $S_4$, $S_5$, or $S_6$ as these signals are fed to the inputs of OR gate 204 and to lead $f_2$ of the flip-flop F2.

The system could miss reading more than one character in a row during the first reading scan as more than one character could be out of vertical alignment. Since the two previous read apertures remain open to the peak detector network 93 until a different logical combination of flip-flops C0 to C15 is formed as shown in FIG. 10, the program counter 106 counts and keeps track of the colums even though a character is misaligned as much as 50 percent because one of the gated read apertures is able to sense a segment of a character even though the character is not correctly read.

If, however, a portion of the character is missing as character "8" in row 15 of FIG. 2, and the character is greatly misaligned (this type of an error is highly improbable), both read apertures that were open by the previous character miss the leading edge of the character "8" and the program counter 106 does not operate during the time interval that this column is scanned. Then at the end of the scan instead of the column counter 109, reading eleven columns, it only reads ten columns. Flip-flop $V5_k$ is false at the end of the scan because the characters are shifted one column position. Flip-flop U5 does not switch true at the rise of E6. Then if the system tries to read the missing character on the next or succeedings scans, it cannot place the missing character in the correct position in the V buffer as some of the characters therein are shifted at least one column.

The system corrects for this type of error by clearing the V buffer of all information. For example, when a column has been missed by the system the signal $K_{10}$ is true but the signal $K_{11}$ is false in the column counter 109 during the time signal E6 is true at the start of the next scan. The signals $K_{10}$, $E_6$ and $V'_{5k}$ and the inverted signal of $K_{11}$ ($K'_{11}$) are fed to the input of an AND gate 206 whose output is coupled to OR gate 197. When the logical product is formed by signals $K_{10}$, $E_6$, $V'_{5k}$, and $K'_{11}$, the V buffer is cleared as all 55 flip-flops are switched false, and also flip-flop U5 is switched false. There is also the highly improbable possibility that two columns instead of one column would be skipped by the column counter. Then when signal $E_6$ is true during the following scan, signal $K_9$ would be true but signals $K_{10}$ and $K_{11}$ are false. To correct for this error another AND gate (not shown) can be provided and, like AND gate 206, its output may be fed to OR gate 197. But instead of feeding four signals $K'_{11}$, $K_{10}$, $E_6$ and $V'_{5k}$ thereto, five signals $K'_{11}$, $K'_{10}$, $K_9$, $E_6$, and $V_{5k}$ should be fed to the inputs of this AND gate.

Since the row of characters was not decoded, scan signal $S_8$ would be true during the next scan and the system tries to read a row as when signal $S_7$ was true. If the same error occurs whereby a column is missed the V buffer will be again cleared and a new attempt to read the row will be made during the next scan.

If, however, the system interprets a dark spot on the tape 12 as a leading edge of a character the column counter 109 may count an extra column so that at the end of a scan, signal $K_{12}$ is true. This condition could occur, for example, when an ink spot 207 (FIG. 2) in row 13 of tape 12 is in a position wherein the program counter 106 has finished counting to $PC_{15}$ for character "2" and starts to recount on sensing the spot 207. Then before the center vertical segment of character "1" is sensed the program counter 106 stops at $PC_{15}$. The program counter will start again when the segment in zone W for character "1" is sensed by a gated read aperture and again when character "b" is sensed. Under these conditions there is a probability that a reject signal may not be formed by AND gate 189 (FIG. 16) and the information in the buffer will be wrong. Therefore, the buffer is cleared by signal $K_{12}$ by feeding the signal $K_{12}$ to OR gate 197 to switch false the flip-flops in the buffer before signal $E_6$ is formed so that the buffer may be refilled.

If during the time $PC_2$, signals $S_{12}$ and $E_6$ are true and the flip-flop U5 is false, the system stops indicating that the row is unreadable and manual entry is made in the output equipment. This time is determined by the logical product of signals $S_{12}$, $U'_5$, $E_6$, and $PC_2$ (signal $PC_2$ is used to allow time for flip-flop U5 to switch true if flip-flops $V5_a$ to $V5_k$ are true) as these signals are fed to an AND gate 209 whose output is fed to a relay (not shown) to stop the motor 37 for the tape 12 and to suitable means (not shown) to mark the row for further reference.

After the V buffer, which includes flip-flops $V1_a$ to $V1_k$, $V2_a$ to $V2_k$, $V3_a$ to $V3_k$, and $V4_a$ to $V4_k$, is filled with a binary code as will be indicated by flip-flop U5 being switched true, the V buffer transfers the information to the output equipment 97. The time at which this process is accomplished is determined by the logical product of signals $U_5$, $PC_3$, and $E_6$ which is fed to the inputs of AND gates 211 and 214 (FIG. 15). For clarity, each of the AND gates 211 to 214 is representative of eleven AND gates, one for each column of the V buffer. The true output of each buffer flip-flop is fed to one of the AND gates. The output of the AND gates is coupled to the output equipment 97. Then at signal $PC_5$, after the information is transferred, the V buffer is cleared by feeding signals $PC_5$, $E_6$, and $U_5$ to AND gate 215.

Figure 3:
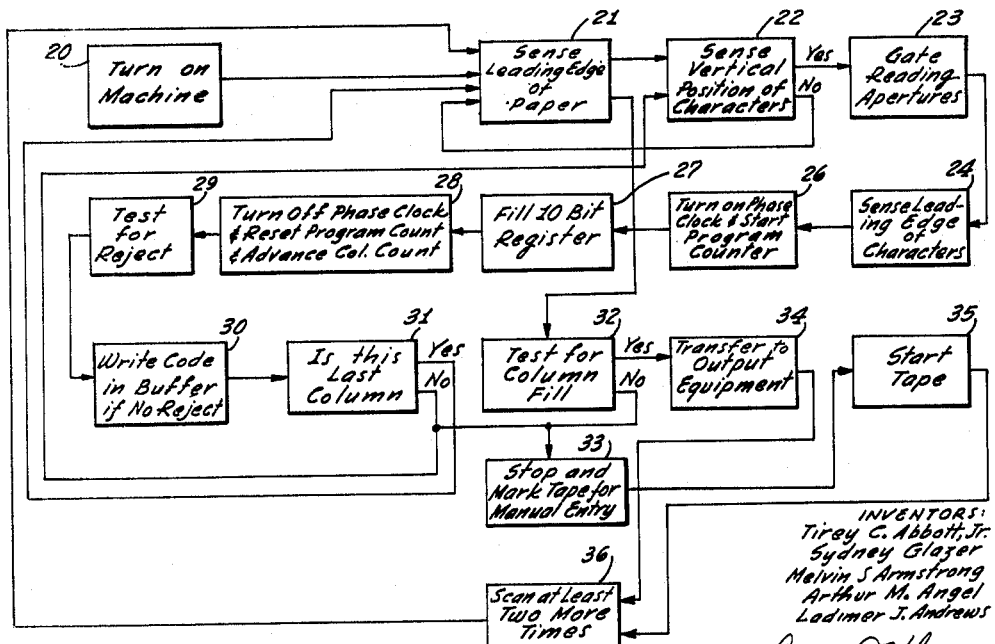
FIG. 3 is a flow diagram showing, generally, the basic steps performed by the system of the present invention in reading characters.

Having described the operation of one embodiment of the invention, a summary of the process for performing a character recognition process using the teachings taught herein is shown in FIG. 3. The block flow diagram indicates generally the basic steps to be performed by a character recognition system that uses the teachings of this invention. Block 20 indicates that the first step is to start the system and as was explained above this includes turning on the power supply (not shown) to energize the logical circuitry into its quiescent state and also clear the V buffer. The tape 12 and rotating mirror 43 are also put in motion so that the scanning operation is continuously performed. Block 21 indicates that the next step is to sense the right-hand edge, i.e., the leading edge of the paper tape 12. This allows time for certain logical operations to be performed before a character is read. Block 22 indicates that the next step is to sense the vertical position of the first character in the row being read. As mentioned above the first character in the row, before it can be read correctly, has to be within prescribed vertical limits with respect to the read stations 47 and 47'. If this character is not in position the system cycles back through block 21 until the tape 12 has moved a sufficient amount so that this character is in position to be read. When the first character is in position to be read block 23 indicates that the next step is to select the two reading apertures and the following step, block 24, provides for sensing the leading edge of the character, that is, the segment in zone U (FIG. 1), as the scanning operation, as described above, proceeds from right to left across the tape. Block 26 indicates that the following step is to turn on the phase clock (the transfluxor 104) to start the program counter 106. Blocks 27 and 28 indicate that while the phase clock is on, the ten bit G register (flip-flops G1 to G10) is filled and afterwards the phase clock is turned off, the program counter 106 is reset, and the column counter 109 is advanced. Block 29 indicates that the next step is to test for rejects and as mentioned above this process is performed by circuit 166 (FIG. 15). If there is no reject, block 30 indicates that the next step is to write this code in the V buffer and then block 31 indicates the next step is to check to determine if this character is the last in a row. This decision is made in the system by automatically cycling back through block 22 and repeating the steps through block 31. When characters are no longer being sensed, the process jumps back to block 21 since the scan is now completed. The leading edge of the tape is next sensed for the next scan (block 21). Then the system cycles through block 32 to determine if all the columns were read in the previous scan and to test if all the column positions in the V buffer are filled. If at least one column has not been read the vertical position of the characters in the same row is again determined (block 22) and the system tries to fill the missing columns in the V buffer. As mentioned above, the system provides six scans (scans $S_7$ to $S_{12}$) in which to fill the V buffer. If after the scan $S_{12}$ the column positions of the V buffer are not filled, block 33 indicates that the system is stopped (as determined by the logic at AND gate 209 (FIG. 15)) and the tape marked for manual entry.

If the column positions of the V buffer are filled, block 34 indicates that the next step is to transfer the information in the V buffer to the output equipment 97. The system cycles through block 36 which indicates that the next step is to scan the tape at least two more times by recycling through block 21.

If the system is in block 33 and the tape is stopped and marked for error, the next operation, block 35, indicates that the tape is started and the system cycles through block 36 to block 21 and scans the tape at least two times before a read scan is made on the next row. It is to be noted that the actual number of scans that is performed before the next row is read is determined by the #1 scan counter 121a. The number of idling scans which are provided in the #1 scan counter 121a can be increased or decreased depending on the type of printing matter the system is reading.

Another feature of this system as mentioned above is the feature whereby a decimal point between the characters on the tape is bypassed during a reading scan (see FIG. 14) whereby errors are not inherently produced by the mark that forms the decimal point. Referring again to FIG. 13 a flip-flop N1 is provided whose true output signal $N_1$ is fed to AND gate 119 together with signal $PC'_{15}$. When signal $N_1$ is present signal $PC'_{15}$ turns off the transfluxor 104. Then when $N_1$ is false the transfluxor is not turned off by signal $PC'_{15}$ but by signal $PC'_{25}$ (signal $PC'_{25}$ is signal $PC_{25}$ delayed 2.5 microseconds) as this signal is fed to OR gate 120 and false lead $_0n_2$. Since the decimal point occurs between the second and third columns, the program counter 106 is made to count up to $PC_{25}$ when counting the program count for reading the character in the second column. This means that flip-flop N1 is preferably switched false before signal $PC_{15}$ is produced. Flip-flop N1 is switched false by the logical product of signal $K_1$ and $PC_1$, as these signals are fed to an AND gate 216 whose output is fed to false lead $_0n_1$ of flip-flop N1. As mentioned before, signal $K_1$ is produced by the column counter 109 at the time of signal $PC_{14}$ when the character in the first column starts the program counter 106 and $K_1$ is true until the next signal $PC_{14}$ forms signal $K_2$. Flip-flop N1 is switched true by signal $PC_{20}$ being fed to input lead $n_1$.

Referring again to FIG. 14, various waveforms of electrical signals are shown with a horizontal time base. The rise in waveform $H_1$ at the left-hand side of the graph indicates the time when the image corresponding to the right-hand edge of the paper passes over the column of read apertures $r1$ to $r17$. At the same time, waveforms $E_6$ and $H_2$ rise and the PC waveform is formed. When the PC waveform has completed a series of 15 cycles, waveforms $E_6$ and $H_2$ fall. During this period (during which $E_6$ is positive in potential) no characters are sensed on the tape but the system provides for initially setting waveforms $Z'_1$, $H_7$, and $H_3$, as shown, and the system is now in a condition to sense the row of characters printed on the tape. After $E_6$ time, i.e., when $E_6$ is at 0 potential, the PD waveform rises when the leading edge of a character in the first column is sensed by one of the read apertures. The rise in waveform PD synchronizes a rise in waveforms BO, $H_2$, and $Z_2$ and waveform PC is again formed to form the series of PC signals, $PC_1$ to $PC_{15}$ for the first column. The waveform $H_3$ rises at the rise of $PC_2$ and signals the system to form a rise in waveform $H_7$ when signal $PC_{13}$ is formed. The signal $H_7$ signals the system to store the row of characters being read into the V buffer. Every time during $PC_1$ to $PC_{15}$ that any one of the read apertures observes a character segment a rise is again formed in waveforms PD and BO, but $H_2$ being high prevents these signals from interfering with the logic. After 15 cycles of the PC waveform, $H_2$ falls and then rises when one of the read apertures senses the leading edge of the image of the character in the second column. The waveform PC is thus again formed at the rise of $H_2$ to form the PC count for the second column. It should be noted that the system provides for reading a row of characters with a decimal point after the second character. Having read the first character in a row, in anticipation of reading the decimal point following the second character, the waveform $H_2$ remains high until 25 cycles of the PC waveform are completed. Therefore, when the waveforms PD and BO rise due to the decimal point being sensed by any one of the read apertures, the signals produced by the rises do not interfere with the logic. After 25 cycles waveform $H_2$ again falls and then rises when one of the read apertures senses the leading edge of the character in the third column to form waveform PC again. In the graph, only the first four series of PC cycles are shown, which includes the time the system is commencing to read the character in the third column. Each of the remaining eight columns is defined by a period during which the PC waveform cycles 15 times. The waveforms $Z'_1$ and $Z_2$, as shown for the first column that follows $E_6$ time, is repeated for the third and all these subsequent columns. Waveform $H_2$ is also repeated for all subsequent columns. Waveforms $H_3$ and $H_7$ remain high for the duration of the scan (all eleven columns) and are switched low during $E_6$ time of the following scan.

During the time the program counter is counting to $PC_{25}$ the image of the decimal point passes across the registration apertures $a0$ to $a15$, and, depending on the alignment of the characters, the image of the decimal point should pass the registration apertures after signal $PC_8$ and before signal $PC_{13}$. During this time, waveform $Z'_1$ (FIG. 14) is low and signal $Z_1$ sets the flip-flops C0 to C15, all false, so that they are ready to register the position of the next character. Signal $Z_1$ is produced when the logical product is formed by signals $PC_8$ and $N'_1$ at AND gate 217 whose output is fed to the OR gate 112 to switch flip-flop Z1 true. Then to switch flip-flop Z1 false, signals $PC_{13}$ and $N'_1$ are fed to an AND gate 218 whose output is fed to the OR gate 116. Since the image of the decimal point has passed the registration aperatures $a0$ to $a15$ the character in the next column now affects the state of the flip-flops C0 to C15 and since flip-flop Z2 was switched false at $PC'_{14}$, flip-flops D1 to D4 are set accordingly. Then, when signal $PC_1$ appears, the logical circuitry 83 is again inhibited. The rise in waveform BO due to the image of the decimal point being read by any of the read apertures $r1$ to $r17$ occurs between signals $PC_{19}$ and $PC_{22}$ and the program counter 106 is not affected.

Although the described embodiment of the apparatus reads characters with a relatively high degree of reliability, the apparatus may be made more reliable by adding more memory units to the V buffer and by adding a feature wherein a character is reread and compared with the reading of a previous read. When a comparison is made with a previous read of a character, the character so matched is assumed to be correct. This feature increases the reliability of the apparatus because if a character was mistaken at one time for another character in the system it would not be mistaken a second time for the same other character. The reliability of this assumption is derived from the facts that a character would not be scanned twice across the same paths $t$ and $b$ due to mechanical tolerances in the system. Also since the clipping level of the registration amplifiers A0 to A15 increases progressively from A0 to A15 as well as the clip level of the read amplifiers R1 to R17 imperfections in the paper or light ink smudges if they are sensed by the amplifiers with low clip levels will not be sensed by the amplifiers with the higher clipping level.

The embodiment of the machine just described has provided the feature wherein a row may be read in any one of a number of scans, six scans to be specific. Therefore, for example, a reading made in scan $S_7$ may be compared with a reading in any one of the succeeding five scans.

Referring to FIG. 17, an embodiment of a buffer is shown wherein the feature of comparing readings is included. This buffer instead of using flip-flop memories like the V buffer shown in FIG. 15, includes for simplicity a memory made of an array 300 of magnetic cores. The cores are arranged in eleven columns of which three $K_1$, $K_2$, and $K_{11}$ are shown and the remaining eight columns are indicated schematically, similar to the V buffer in FIG. 15, wherein 5 columns are indicated schematically. This buffer, also like the V buffer of FIG. 15 has the capacity of storing information concerning all the characters in a row. This buffer 300 has nine rows of cores, four of which are used to store the four bit code and the remaining five of which are used to store other information concerning each character. Each of the eleven columns is thus provided with nine magnetic cores. Each of the eleven columns of cores, thus stores the four bit code of a respective one of the eleven characters in a row on tape 12 (FIG. 2). The first to fourth cores (as viewed in the drawing) in each row store the four bit binary code as obtained from the code converter circuit 166 (FIG. 16). Hereinafter, since the four bit binary code represents one of the characters as shown in FIG. 1, the terminology character includes by definition the four bit binary code representative of a character. The other five cores in each column are used to store information concerning the character stored in the first four cores of that column. For example, one core, the sixth row from the top, will indicate whether that column is storing a four bit binary code or character; another core, the fifth row from the top, will indicate whether that four bit binary code was read only once; another core, seventh row from the top, will indicate whether the character code in the first four cores was correctly compared with a previous reading; another core, the second row from the bottom, will indicate whether the column counter 109 counted eleven columns, no more or no less, and the row is acceptable; and the last or bottom core will indicate that the first four cores are cleared of a character. Although a core buffer is shown, a flip-flop buffer could be used to incorporate the novel features to be described.

The core buffer 390 has nine write drive lines 301 to 309 threaded through each of the eleven annular cores in one row; one drive line is provided per row. The drive lines 301 to 307 are grounded at one end and are connected by the other end to the true output of one of the flip-flops Y1 to Y7, whereby when the respective true outputs are positive or binary "one's" are stored in the flip-flops Y1 to Y7 each drive line supplies one-half the "write" current for the cores in the row. Since, like most core buffers, the cores are annular and have a square wave hysteresis loop, the "write" current is the current necessary to reverse the magnetization in the cores. Drive lines 308 and 309 are clamped to a negative potential $-V$ at one end while the other ends are connected to suitable gates, to be described hereinafter, which gates when opened become positive to supply the total "write" current to these drive lines 308 and 309. It is understood that conventional core drives may be inserted in the drive lines 301 to 309, 310a to 310k, and 312a to 412k, to switch the cores.

The other half of the write current for the cores in the top seven rows is supplied by eleven vertical write drive lines 310a, 310b, 310c, 310d, 310e, 310f, 310g, 310h, 310i, 310j, and 310k (like the columns of cores only the lines 310a, 310b, and 310k are shown and the others are indicated schematically). Each of the write lines 310a to 310k is threaded through the top seven cores in each of the eleven columns so that the current in write drive lines 310a to 310k adds to the current in write drive lines 301 to 307 to supply full write current to particular cores. The signals $K_1$ to $K_{11}$ from the column counter 109 are coupled to one end of write drive lines 310a to 310k, respectively, while the other ends of the drive lines are coupled, in common, to an emitter of a transistor 311. Since the signals $K_1$ to $K_{11}$ are positive, transistor 311 is a PNP type with the collector grounded. The base of the transistor 311 is coupled to an inverter I which provides a ground or zero potential to the base when a signal passes through an AND gate 314 to whose inputs are fed high signals, i.e., positive potential signals $PC_{13}$ and $H_7$. When the base of the transistor 311 is grounded, the transistor switches on. In this manner, by applying current to any two cross write drive lines a binary one is able to be written in any one of the cores in the top seven rows. For example, at the time signals $H_7$, $K_1$, and $PC_{13}$ are positive one-half write current is applied to drive line 310a to cause those cores in the first column which also receive one-half write current from the Y1 to Y7 flip-flops to receive a full write select current to switch from the "0" or false state to the "1" or true state. The other cores in the first column as well as all the other cores in the array 300 receive no greater than one-half write current and therefore remain essentially undisturbed.

Each column of cores, besides having a write drive line threaded through the cores, has a read drive line 312a, 312b, 312c, 312d, 312e, 312f, 312g, 312h, 312i, 312j, 312k, one for each column, respectively. Each read drive line 312a to 312k is threaded through all nine cores in a column including the two bottom cores which have write drive lines 308 and 309 threaded therethrough. The bottom ends of read drive lines 312a to 312k are connected, in common, to an emitter of a PNP transistor 313 whose collector is clamped to the minus potential $-V$. The base of the transistor 313 is coupled to an inverter I which places a ground potential on the base when a signal passes through an AND gate 315 to whose inputs are fed positive, i.e., high potential signals $PC_1$ and $H_7$. When the base of transistor 313 is grounded, the transistor switches on. The top end of each of the drive lines 312a to 312k is connected to signals $K_1$ to $K_{11}$, respectively, with signal $K_1$ coupled to read line 312a, signal $K_2$ coupled to 312b, etc. for reasons that will become apparent hereinafter. Since signals $K_1$ to $K_{11}$ are positive in potential and the collector of transistor 313 is clamped at a $-V$ potential the current in any one of these drive lines is sufficient to switch the magnetic state of the cores in that column. The read drive lines are threaded through the cores in a direction opposite to the write drive lines so that the cores in the "1" state will be switched to the "0" state and the cores in the "0" state will remain substantially unchanged. The changes from the "1" state to the "0" state are sensed by sense lines 321 to 329 that are threaded through each row of cores so that an E.M.F. is formed in the sense lines due to the switching from "1" state to the "0" state. The E.M.F. signals are amplified in suitable amplifiers 331 to 339, respectively, and the amplified signals are used to switch the respective flip-flops Y1 to Y9 into a true state. For example, at the time signals $K_1$, $H_7$, and $PC_1$ are positive a current passes through read line 312a. The cores in the first column set in the "1" state switch to the "0" state and produce a signal on their respective sense lines. The flip-flops Y1 to Y9 will now contain the binary code the cores contained provided the flip-flops were originally false.

To understand the operation of the buffer as shown in FIG. 17, a description of the operation thereof will be decribed as a row of characters is being read. The system performs the same operational steps as before up to block 24 (FIG. 3) except that when the machine is turned on, the signal $M_2$ that was formed, as mentioned above, is applied to an OR gate 341. This causes all the cores threaded to drive line 309 to switch to the "1" state to indicate that no information is stored in the corresponding columns of the buffer or the information therein is to be disregarded. It should be understood that the cores in the bottom row of array 300 are used in the same manner as flip-flops V5a to V5k in FIG. 15, to indicate whether an acceptable code representing a character has been stored in the respective columns of the buffer. The signal $PC_{13}$ formed during the time the signal $E_6$ is present switches flip-flops V1 to V4 into a false state, as the signal $PC_{13}$ is fed to false leads $_0v_1$ to $_0v_4$. After the system reads a character it tests for a reject in the same manner as described above. Now at the fall of $PC_{14}$ (signal $PC'_{14}$) the four bit binary code is placed in flip-flops V1 to V4 of FIG. 17 instead of flip-flops V1$a$ to V4$a$ of the previously described embodiment shown in FIG. 15, as the leads $v_1$, $v_2$, $v_3$, and $v_4$ from the code converter circuitry (FIG. 16) are now coupled to the true inputs of the respective flip-flops V1 to V4, as shown. As before, when the flip-flops are in a true state a binary "1" is stored and when they are in a false state a binary "0" is stored. Leads $v_1$ to $v_4$ will contain signals indicative of a character only if a reject signal did not pass through AND gate 189 (FIG. 16). Signals $H_7$ and $PC_1$ cause transistor 313 to conduct and, since the first column is being read, the signal $K_1$ is present, a read current passes through drive line 312$a$ causing the bottom core in the first column to switch and form a signal in sense line 329 which signal is amplified in amplifier 339 and fed to true lead $y_9$ of flip-flop Y9 to switch it true. If any of the other cores in the first column are in the "1" state, those respective flip-flops Y1 to Y8 would also switch true but as will become apparent the system disregards this information and only uses the information in flip-flop Y9. The true signal $Y_9$ with signal $PC_3$ is coupled to a gate 342 which forms a logical operation and which is, in turn, coupled to true lead $y_{11}$ of flip-flop Y11 to form a true signal $Y_{11}$. Referring to FIG. 23 wherein gate 342 is shown schematically, more specifically, signals $Y_9$ and $PC_3$ are fed to an AND gate 343 whose output feeds a signal to OR gate 344, in turn, to switch flip-flop Y11 true. Signal $Y_{11}$ is fed to eight AND gates 346$a$ to 346$h$ (FIG. 17). Also, as shown, true signal $V_1$ is fed to AND gate 346$a$, false signal $V'_1$ is fed to 346$b$, true signal $V_2$ is fed to 346$c$, etc. At the formation of signal $PC_4$ either AND gate 346$a$ or 346$b$ and either 346$c$ or 346$d$ and either 346$e$ or 346$f$ and either 346$g$ or 346$h$ will be opened to feed a signal to respective OR gates 347$a$ to 347$h$ causing the four bit binary code to be transferred from flip-flops V1 to V4 to flip-flops Y1 to Y4. Then at signals $PC_{13}$ and $H_7$ before the column counter 109 advances to $K_2$ transistor 311 is opened to cause one-half write current to flow in write line 310$a$ to cause the respective top four cores in the first column position of the buffer to store a "one" which respective cores have one-half write current in any of write lines 301 to 304 as determined by which ones of the flip-flops Y1 to Y4 are true.

Going back in time to the formation of signal $PC_4$, flip-flops Y5 to Y8 are switched to assume given states as determined by the logical operation performed by the signals fed to the respective gates 348 to 353, and OR gates 354, 355, and 356. Gate 348 has its output coupled to true lead $y_5$ of flip-flop Y5 while gate 349 has its output coupled to false lead $_0y_5$ thereto. Gate 350 has its output coupled to true lead $y_6$ of flip-flop Y6 while gate 351 has its output coupled to false lead $_0y_6$ thereto. Gate 352 has its output coupled to true lead $y_7$ but the false lead $_0y_7$ is coupled to the output of an OR gate 354. OR gate 355 has its output coupled to true lead $y_8$ of flip-flop Y8 with gate 353 having its output coupled to false lead $_0y_8$. $PC_4$ is fed to OR gate 356 and in turn to false lead $_0y_9$ of flip-flop Y9.

As mentioned with reference to FIG. 16, if the ten bit code in the G register is not rejected a signal is formed in true lead $v_5$ and in this embodiment lead $v_5$ is coupled to flip-flop V5 to switch flip-flop V5 true at the same time the character or its code is stored in flip-flops V1 to V4. The true signal of flip-flop V5 is also fed with signal $PC_4$ to respective gates 348 to 353 to perform logical operations. Referring to FIGS. 18$a$, 18$b$, 19$a$, 19$b$, 20 and 21 the respective gates 348 to 353 are shown schematically. The logical product of signals $Y_9$, $V_5$, and $PC_4$ is fed to AND gate 361 (FIG. 18$a$) whose output is fed to OR gate 362 causing flip-flop Y5 to switch true. The logical product of signals $Y_9$, $Y_5$, and $PC_4$ is also fed to AND gate 363 (FIG. 19$a$) whose outlet is fed to OR gate 364 causing flip-flop Y6 to switch true. Flip-flop Y7 is switched false by the logical product of signals $Y_9$ and $PC_4$ fed to AND gate 365 (FIG. 17) whose output is fed to OR gate 354. Flip-flop Y8 is switched false by the logical product of signals $Y_9$ and $PC_4$ being fed to AND gate 366 (FIG. 21) whose output is fed to OR gate 367. Flip-flop Y9 is switched false by signal $PC_4$ being fed to OR gate 356 (FIG. 17) and false lead $_0y_9$. When signal $PC_{13}$ is formed, the fifth to ninth core in the first column position will store the information which is that the character stored in the first formed cores was read without a reject and one time only because only flip-flops Y5 to Y6 are true. Thus, at the same time when signals $PC_{13}$ and $H_7$ has opened transistor 311 in order to store the character code in the first four cores, the two cores threaded by write leads 310$a$, 305, and 306 are also switched in the "1" state.

During the time the four bit binary code is being transferred from the flip-flops V1 to V4 to the flip-flops Y1 to Y4 the character in the second row is being filled into the G register, flip-flops G1 to G10 (FIG. 15). By the time signal $PC'_{14}$ is formed the first character has been stored in the buffer 300 and the signal $PC_{13}$ having been fed to leads $_0v_1$, $_0v_2$, $_0v_3$, and $_0v_4$, has switched the flip-flops V1 to V4 false so that the second character may be stored in flip-flops V1 to V4. But now let it be assumed for some reason that the ten bit code in flip-flops G1 to G10 is rejected by the rejection circuit 166 of FIG. 16 to produce a pulse in lead 189$a$ at the fall of $PC_{14}$. The reject signal in lead 189$a$ is fed to false lead $_0v_5$ of flip-flop V5 to switch it false. Again at the formation of $PC_1$ transistor 313 is opened and, since signal $K_2$ is fed to read drive lead 312$b$, the binary information in the second column position is transferred, as before, by the respective sense lines 321 to 329 to flip-flops Y1 to Y9. Then after $PC_1$ is formed at least flip-flop Y9 is in the true state as this is the first time this column is being read.

Referring to FIGS. 18$b$ and 19$b$ the logical product $Y_9$, $V'_5$ and $PC_4$ is formed in both AND gates 373 and 374, whose outputs are coupled to OR gates 371 and 372, respectively, to switch flip-flops Y5 and Y6 false if not already false. Also the logical product $Y_9$ and $PC_4$ is formed in AND gate 365 (FIG. 17) to pass a signal to switch flip-flop Y7 false, also AND gate 366 (FIG. 21) passes a signal to switch flip-flop Y8 false, and flip-flop Y9 is also switched false by signal $PC_4$ passing through OR gate 356.

Since the system will disregard the information in flip-flops V1 to V4 since the flip-flop V5 was switched false to indicate a rejection, it is immaterial that the logical product $Y_9$ and $PC_3$ will open AND gate 343 (FIG. 23) to switch flip-flop Y11 true in turn to open respective AND gates 346$a$ to 346$h$. Then at the formation of signal $PC_{13}$ the bottom three cores in the second column which cores are threaded to lines 305 to 307 will remain in the zero state since only drive line 310$b$ has a write current which is only one-half value.

The system tries to read the characters in the remaining nine columns in the row of tape and each character is stored or not stored in the buffer 300. Then after the first read scan $S_7$ the bottom five cores in each column position would contain either the binary code 11000, indicating that the information in the first four cores of the particular column position may be useful and represents a character, or the binary code 00000, indicating that no useful information or character is stored in the first four cores of the particular column position.

Since the row of characters has not been read correctly or has not been checked with a previous scan the resetting of #1 and #2 scan counters 121$a$ and 121$b$, respectively, is to be inhibited. In the embodiment shown in FIG. 15 the true signal $U_5$ was formed by flip-flop $U_5$ being in the true state. In the embodiment shown in FIG. 17, a flip-flop $U5_a$ is substituted for flip-flop U5. Then by appropriate switching (not shown) signal $U_5$ that is fed to AND gates 127, 128, 129, 130, 131, and 132 (FIG. 13) is substituted by signal $U_{5a}$ as obtained from the true state of flip-flop $U5_a$. The state of flip-flop $U5_a$ is determined by either or both flip-flops U1 and V6 wherein flip-flop $U5_a$ is true when both flip-flops U1 and V6 are false and is false when either one of the flip-flops V1 and V6 is true.

Since flip-flop V6 cannot switch true during the first read scan, the state of flip-flop U1 determines whether flip-flops $U5_a$ will be true or false after the first scan. The state of flip-flop U1 is in turn determined by the state of flip-flop U2 which is switched true by the logical product formed by signals $Y'_7$ and $PC_5$ at AND gate 375 whose output is coupled to true lead $u_2$ of flip-flop U2. The true signal $U_2$ is fed to an AND gate 376 together with signals $E_6$ and $PC_7$. The output of AND gate 376 feeds a signal to an OR gate 377 and in turn to true lead $u_1$ of flip-flop U1. When flip-flop U1 switches true a signal $U_1$ is fed to OR gate 378 and in turn to lead $_0u_{5a}$ of flip-flop $U5_a$ switching flip-flop $U5_a$ false to form signal $U'_{5a}$. Then when the signals $E_6$ and $PC_{11}$ are formed, the resetting of the scan counter is prevented as signal $U_{5a}$ is zero.

Also at the beginning of the next scan if the logical product $E_6$, $PC_6$, $K'_{10}$, $K_{11}$, and $K'_{12}$ is formed in AND gate 379 a signal passes to write drive line 308 to write a "1" in all the cores in that row and to OR gate 355 to true lead $y_8$ to switch it true. As mentioned above a "1" in this row of cores indicates that the scan $S_7$ has scanned an acceptable row of characters on the tape since the column counter counted just eleven columns and any non-rejected character stored is acceptable. The binary code in the bottom five cores is either 11010 or 00010 depending on whether or not a character is stored in that column. If more or less columns than eleven were read by the machine the binary one would not be stored in the eighth row of cores through which drive line 308 is threaded.

The system now forms another scan and rereads the row of characters. Signal $S_8$ is formed by the scan counter 121b and it is assumed during this scan that the characters that are stored are acceptable because a binary one is stored in all the cores of the eighth row from the top. During the reread, the character in the first column is read a second time and, if the read is rejected, a four bit code is not stored in flip-flops V1 to V4 at the formation of signal $PC'_{14}$. When signal $PC_1$ is formed and since signal $K_1$ is also present the first column position of the core buffer is read and the information in the cores of the first column position is transferred to the flip-flops Y1 to Y9 so that flip-flops Y1 to Y4 contain the character read during the previous scan, and flip-flops Y5 to Y9 are in the states 11010, respectively, indicating that the character in the first column position is acceptable. Since the new read has been rejected flip-flop V5 is switched false by the signal passing through AND gate 189 (FIG. 16). At the formation of signal $PC_4$ flip-flop Y5 is switched false by the logical product formed by signals $Y_6$, $V'_5$, and $PC_4$ at AND gate 460 (FIG. 18b) to feed a signal to OR gate 371. The logical product formed by signals $Y_6$ and $PC_4$ at AND gate 394 (FIG. 21) passes a signal to OR gate 367 to switch flip-flop Y8 false. Flip-flops Y5 to Y9 being in the states 01000, respectively, indicate that the character in the flip-flops Y1 to Y4 that was read in the previous scan is still acceptable and this code is stored in the buffer at the formation of $PC_{13}$. The logical product formed by signals $V'_5$, $H_7$, and $PC_{15}$ at AND gate 434 passes a signal to switch flip-flop U1 true and, in turn flip-flop $U5a$ false.

However, during the reread of the first column, if the character is read without a reject, a four bit character code is again stored in flip-flops V1 to V4 at the formation of signal $PC'_{14}$ and flip-flop V5 is switched true. When signal $PC_1$ is formed the first column position of the core buffer is read and the information in the respective cores is transferred to the flip-flops Y1 to Y9. The flip-flops Y5 to Y9 assume the states 11010, respectively, since the previous read provided an acceptable four bit code. Since signal $V_5$ is true, a gate 381 (FIG. 17) will form a logical operation which is to compare the states of the V1 to V4 flip-flops to the states of the flip-flops Y1 to Y4 and switch flip-flop Y10 false if there is no equality.

Referring to FIG. 22 wherein gate 381 is shown schematically, the logical product of signals $V_5$, $PC_2$ and $Y'_9$ passes a signal through AND gate 382. The output of AND gate 382 is fed to eight AND gates 383a to 383h where the information in flip-flops V1 to V4 is compared to the information in flip-flops Y1 to Y4. If they are not equal a signal passes through at least one of the AND gates 383a to 383h to OR gate 384 to switch flip-flop Y10 false. The siganl $Y'_{10}$ is coupled to a gate 385 (FIG. 17) which forms a logical operation and flip-flop V6 switches true if a particular logical combination is present.

Referring to FIG. 24, wherein gate 385 is shown schematically when the logical product is formed by signals $PC_3$ and $V_5$ at AND gate 386, a signal passes therethrough to feed a signal to five other AND gates 387, 388, 389, 391, and 392. Since the character of the column in consideration was read without a reject but with a mismatch the logical product is formed by signals $Y_6$, $Y'_7$, $Y_8$, $Y'_9$, and $Y'_{10}$ at AND gate 388 and a signal passes therethrough to OR gate 393 to switch flip-flop V6 true to indicate the mismatch or error. Flip-flop Y11 was switched false at the formation of signal $PC_1$ and does not switch true at $PC_3$ since no logical product, as shown in FIG. 23, is present. The code in flip-flops V1 to V4 is not transferred to flip-flops Y1 to Y4 because the flip-flop Y8, being true, indicates that the previous read is probably better than this read, remembering that the correct number of columns was counted by the system in the previous scan. The present scan may not form a correct column count. Flip-flop Y8 is switched false since signals $Y_6$ and $PC_4$ open AND gate 394 (FIG. 21). Also flip-flop Y6 is switched false since the logical product formed by signals $Y_5$, $Y_8$, $Y'_9$, $Y'_{10}$, $V_5$, and $PC_4$ passes a signal through AND gate 395 (FIG. 19b) to OR gate 372, but flip-flop Y5 remains true. The combination comprising flip-flop Y5 being true and the flip-flops Y6 to Y9 being false indicates that the character read in the previous read has been mismatched with a second read and may not be acceptable.

If a match happened to be formed flip-flop Y10 would remain true as it was switched true by signal $PC_1$ and in turn flip-flop Y7 is switched true by the logical product formed by signals $Y_5$, $Y_6$, $Y'_9$, $V_5$, $Y_{10}$, and $PC_4$ at AND gate 396 (FIG. 20) whose output is fed to OR gate 397. Flip-flop Y7 is denoted as the confidence bit because when it contains a binary one or is true, it indicates that two non-rejected reads were made and matched with each other.

The system next scans the second column and if this character is read without a rejection the code is transferred to flip-flops V1 to V4 at the formation of signal $PC'_{14}$ and the flip-flop V5 is switched true. Flip-flops Y1 to Y9 are again switched false by signal $PC_{15}$ and at the formation of signal $PC_1$ the information in the cores of the second column is read and stored in flip-flops Y1 to Y9. Since during the previous scan the character in this column position was rejected by the system but the read scan was accepted since eleven columns were counted, flip-flops Y5 to Y9 are placed in the states 00010, respectively. At the formation of signal $PC_3$, flip-flop Y11 is switched true as the logical product of signals $Y'_5$, $Y'_6$, $Y'_9$, and $PC_3$ passes a signal through AND gate 399 (FIG. 23). No comparison is required since no character was stored in that column position of the buffer 300. At the formation of signal $PC_4$ the logical product formed by signals $Y'_6$, $Y'_7$, $V_5$, and $PC_4$ passes a signal through AND gate 401 (FIG. 18a) and OR gate 362 to switch flip-flop Y5 true and the logical product formed by signals $Y'_5$, $Y'_7$, $Y'_8$, $V_5$, and $PC_4$ passes a signal through AND gate 402 (FIG. 19a) and OR gate 364 to switch flip-flop Y6 true. Flip-flop Y8 is switched false by the logical product of $Y'_5$, $Y'_6$, $Y'_7$, and $PC_4$ passing a signal through AND gate 403 (FIG. 21) and OR gate 367. The logical product of $Y'_5$, $Y'_6$, $Y'_7$, and $PC_4$ formed at AND gate 403 (FIG. 21) also switches flip-flop Y8 false.

The system continues operation of rereading the characters in the row and records the readings as described. If however, during the second read scan the previous row has not been accepted, as indicated by all the cores in the eighth row of the buffer 300 being in the zero state, then when the first column of the buffer is read, flip-flops Y5 to Y9 are placed in the states 11000, respectively, indicating that in the previous read a character has been stored and the read scan has not been accepted. After reading the character in the first column and the code is not rejected, instead of performing the comparison operation, the code in flip-flops V1 to V4 is transferred to flip-flops Y1 to Y4 at signal $PC_4$ because flip-flop Y11 was switched true by an operation performed in gate 342. In particular, the logical product formed by signals $Y_5$, $Y_6$, $Y'_7$, $Y'_8$, $Y'_9$, and $PC_3$ at AND gate 398 (FIG. 23) passes a signal to OR gate 344. The character from the previous read is disregarded, as the previous read scan was not accepted as indicated by flip-flop Y8 being false. The flip-flops Y5 to Y9, after the formation of signal $PC_4$, are in the same state as they were in before the signal $PC_4$ was formed.

If, however, during the second or reread scan the character in the first column was rejected, flip-flop V5 is switched false. Then the logical product formed at AND gate 460 (FIG. 18b) passes a signal and switches flip-flop Y5 false. The logical product formed at AND gate 462 (FIG. 19b) passes a signal to switch flip-flop Y6 false. The information in flip-flops Y1 to Y4 is now disregarded since the Y5 to Y9 flip-flops are all in the false state.

Again at the formation of signal $PC_{13}$ the information stored in the flip-flops Y1 to Y9 is transferred and stored in the cores of the first column position since signal $K_1$ is still positive, but all the cores remain in the zero state.

The system next scans the character in the second column and then, after signal $PC_1$ is initiated, the read operation is performed and flip-flops Y5 to Y9 assume the states 00000, respectively. Again, assuming that the second column character during the reread is not rejected then at the formation of signal $PC_4$ the flip-flops Y5 to Y9 are switched to the states 11000, respectively, as AND gate 401 (FIG. 18a) and AND gate 402 (FIG. 19a) both pass a signal. If, however, after scanning the character of the second column, a reject is indicated, no change in the state of the flip-flops Y5 to Y9 occurs.

The system continues the read operation on the remaining characters in the row and stores the information in the buffer 300.

After the row of characters has been read a second time the cores in the fifth to ninth rows are in the following states: if an equal comparison has been made with the previous read, that particular column has its fifth to ninth cores in the states 11100, respectively. If an equal comparison has not been made, that particular column has its fifth to ninth cores in the states 10000, and flip-flop V6 is switched true to indicate the mismatch. If the second read has been rejected but the first read was not rejected that particular column has its fifth to ninth cores in the states 01000, respectively, to indicate an accepted read and then a reject. If the second read has not been rejected but the first read has been rejected the particular column has its fifth to ninth cores in the states 11000, respectively, to indicate a character has been read once for that column. If a read for a particular column has been rejected in the first and second read scans, the column position has its fifth to ninth cores in the states 00000, respectively.

After the second read scan, if the logical product is again formed by $E_6$, $PC_6$, $K'_{10}$, $K_{11}$, and $K'_{12}$ a signal passes through AND gate 379 to write a "1" in the eighth row of cores of the eleven columns.

Since all the characters in the column have not been compared with a previous read the scan counters are still inhibited from being reset. Resetting is inhibited because the true signal $U_{5a}$ it not formed at the same time the signals $E_6$ and $PC_{11}$ are formed as will now be described.

During the first read scan $S_7$, flip-flop $U5_a$ was switched false at the time flip-flop U2 was switched true to prevent resetting of the scan counters 121a and 121b. In the following scan at the formation of signals $E_6$ and $PC_{15}$ flip-flop $U5_a$ is switched true only when flip-flops U1 and V6 are both switched false. Flip-flop U1 is switched false by the logical product formed by signals $E_6$ and $PC_{15}$ at AND gate 430 whose output feeds a signal to false lead $_0u_1$ of flip-flop U1, and flip-flop V6 is also switched false by the logical product formed by signals $E_6$ and $PC_{15}$ at AND gate 431 whose ouput feeds a signal to false lead $_0v_6$ of flip-flop V6. Also the logical product formed by signals $E_6$ and $PC_{15}$ at AND gate 432 passes a signal to lead $_0u_2$ to switch flip-flop U2 false. Signals $PC_{15}$, $V'_6$, and $U'_1$ are fed to an AND gate 433 whose output feeds a signal to true lead $U_{5a}$ of flip-flop $U5_a$. When a reject or error is observed by the system in scan $S_8$ flip-flop $U_{5a}$ is switched false, because as mentioned above, if either flip-flop V6 or U1 is switched true, flip-flop $U5_a$ is switched false as signals $V_6$ and $U_1$ are fed to OR gate 378 whose output feeds a signal to false lead $_0u_{5a}$ of flip-flop $U5_a$.

During the second reading scan $S_8$, a reject signal passing AND gate 189 (FIG. 16) causes flip-flop V5 to switch false. Then when the logical product is formed by signals $V'_5$, $H_7$, and $PC_{15}$ at AND gate 434 a signal passes to OR gate 377 to switch flip-flop U1 true and in turn flip-flop $U5_a$ is switched false. Flip-flop $U5_a$ is also switched false when a mismatch is formed during a scan.

After the second reading scan the states of the fifth to ninth cores are either, 00000, 01000, 10000, 11000, or 11100, respectively. Flip-flop U2 has been switched true during this scan when the logical product was formed by signals $Y'_7$ and $PC_5$ at AND gate 375 to cause a signal to be coupled to true lead $u_2$ of flip-flop U2. Flip-flop U1, in turn, is switched true and flip-flop $U5_a$ is switched false to indicate that another read scan is to be performed on the row of characters. AND gate 379 (FIG. 17) again determines whether the state of all the eight rows of cores are either in state "0" to indicate that the previous scan was not accepted or in state "1" to indicate that the previous scan was accepted.

During scan $S_9$, if the states of the flip-flops Y5 to Y9, after the memory 300 was read out by the formation of signal $PC_1$, are either 00000, 00010, 11000, or 11010, respectively, the process for determining a match or mismatch described above is repeated. However, if the states of the Y5 to Y9 flip-flops are 01000 or 01010, respectively, the following operation is performed by the system after a character is reread. The reread character code is tested for rejects as before. If the character code was rejected, flip-flop V5 is again switched false. Flip-flop Y11 is not switched true as gate 342 (FIG. 17) does not pass a signal and the states of the flip-flops Y5 to Y9 do not change after the formation of signal $PC_4$ except that if flip-flop Y8 is true it is switched false by a signal passing through AND gate 394 (FIG. 21).

If the character code was not rejected, flip-flop V5 is switched true, but again, flip-flop Y11 is not switched true since the code in the buffer is presumed good. The code 010 in flip-flops Y5, Y6, and Y7 indicates that the read scan, which produced the code in the buffer, counted correctly eleven columns. The gate 381 coupled to the false input $_0y_{10}$ performs a comparison between the character in flip-flops V1 to V4 and the character in flip-flops Y1 to Y4. If they mismatch a false signal $Y'_{10}$ is produced and fed to gate 385. In gate 385 either AND gate 388 or 389 (FIG. 24) passes a signal depending on the state of flip-flop Y8. Flip-flop V6 is switched true indicating a mismatch. At the formation of signal $PC_4$, AND gate 440 (FIG. 18a) passes a signal to OR gate 362 to switch flip-flop Y5 true. At the same time, AND gate 441 (FIG. 19b) passes a signal to OR gate 372 to switch flip-flop Y6 false. If flip-flop Y8 is true, AND gate 394 (FIG. 21) passes a signal to OR gate 367 to switch flip-flop Y8 false. After the formation of signal $PC_4$ the flip-flops Y5 to Y9 are in the states 10000, respectively.

However, when the states of the Y5 to Y9 flip-flops are 01000 or 01010, respectively and the character in flip-flops V1 to V4 matches the character in flip-flops Y1 to Y4 flip-flop Y10 remains in the true state, inhibiting flip-flop V6 from switching true. Then at the formation of signal $PC_4$, flip-flop Y5 is switched true as the AND gate 440 (FIG. 18a) passes a signal. At the same time, AND gate 442 (FIG. 20) passes a signal to OR gate 397 to switch flip-flop Y7. If flip-flop Y8 is true, AND gate 394 (FIG. 21) passes a signal to switch it false and after the formation of signal $PC_4$ the flip-flops Y5 to Y9 are in the states 11100, respectively.

However, if at the time a character is being reread and checked and after the read operation is performed on the buffer, flip-flop Y5 to Y9 are in the states 10000, respectively, the following results are obtained. If the character is rejected, flip-flop V5 is switched false, and flip-flop Y11 is not switched true. Then at the formation of signal $PC_4$, AND gate 443 (FIG. 18b) passes a signal to switch flip-flop Y5 false. At the same time AND gate 444 (FIG. 19a) passes a signal to OR gate 364 to switch flip-flop Y6 true. Flip-flop V6 is not switched true but flip-flop U1 is switched true by the signal passing AND gate 434, in turn, to produce false signal $U'_{5a}$.

Now, however, next to be discussed is what happens when a no reject signal is produced by AND gate 186 (FIG. 16). Flip-flop V5 is switched true. At the formation of signal $PC_2$ a comparison is made as AND gate 382 (FIG. 22) passes a signal to AND gates 383a to 383h. If there is a mismatch, flip-flop Y10 is switched false by a signal passing through one of the AND gates to OR gate 384. Then at the formation of signal $PC_3$ AND gates 386 and 391 (FIG. 24) pass a signal to OR gate 393 to switch flip-flop V6 true indicating an error. The states of the flip-flops Y5 to Y9 are not altered during the formation of signal $PC_4$.

If, however, when flip-flops Y5 to Y9 are in the states 10000, respectively, and the character in flip-flops V1 to V4 matches the character in flip-flops Y1 to Y4, flip-flop Y10 remains true. Then at the formation of signal $PC_4$, AND gate 446 (FIG. 19a) passes a signal to OR gate 364 to switch flip-flop Y6 true. Also AND gate 447 (FIG. 20) passes a signal to OR gate 397 to switch flip-flop Y7 true.

However, if at the time a character is being reread and checked and after the read operation is performed on the buffer, flip-flops Y5 to Y9 are in the states 10010, respectively, instead of in the states 10000, respectively, the following results are obtained. If the character is rejected, substantially the same results occur as when the character has been rejected when the flip-flops Y5 to Y9 are in the states 10000, respectively. However, after the formation of signal $PC_4$, also flip-flop Y8 is switched false as a signal is passed by AND gate 448 (FIG. 21) to OR gate 367.

If the character is not rejected, as indicated by flip-flop V5 being true but the character being mismatched, the transfer flip-flop Y11 is switched true at the formation of signal $PC_3$ as the logical product formed by signals $Y_5$, $Y'_6$, $Y'_7$, $Y_8$, $V_5$, and $Y'_{10}$ at AND gate 449 (FIG. 23) passes a signal to OR gate 344. Then at the formation of signal $PC_4$ the character code is transferred from flip-flops V1 to V4 to flip-flops Y1 to Y4. In this case the new character is saved instead of the old character because the flip-flops Y5 to Y9, being in the states 10010, respectively, indicate that at least twice before the character has been read without a reject and the line was twice accepted but still a match is not obtainable. Therefore, the character in the buffer is probably wrong and the new character code replaces the old character code in that column position. Also, at the formation of signal $PC_4$, AND gate 451 (FIG. 19a) passes a signal to OR gate 364 to switch flip-flop Y6 true. At the same time flip-flop Y8 switches false as AND gate 448 (FIG. 21) passes a signal to OR gate 367. The flip-flops Y5 to Y9, after the formation of signal $PC_4$, are in the states 11000, respectively. Since flip-flop Y7 is not switched true at $PC_4$ time, AND gate 375 (FIG. 17) passes a signal at the formation of signal $PC_5$ switching flip-flop U2 true. At the start of the next scan the logical product $U_2$, $E_6$, and $PC_7$ formed at AND gate 376 switches flip-flop U1 true and, in turn, flip-flop $U5_a$ false, to prevent the resetting of the scan counter.

However, if the new read is not rejected and is not mismatched, at the formation signal $PC_4$, the flip-flops Y5 to Y9 being in the states 10010, respectively, switch to the states 11100, respectively, as AND gate 451 (FIG. 19a), AND gate 447 (FIG. 20), and AND gate 448 (FIG. 21) pass signals.

At the next read scan the condition occurs where some of the characters in the buffer have been matched and some have never been matched but the error flip-flop V6 was not switched true, an example of this condition is when the Y5 to Y9 flip-flops were switched from 10010 to 11000 even though a mismatch occurred. This condition prevents flip-flop V6 from being switched true because there is a great probability that the character code last stored in the buffer is correct. The probability is great because, as mentioned above, combination 10010 indicates that the character in the column has been read twice without a reject and the read scan has counted correctly eleven columns, twice, but a match has not been obtained between two readings. When that column position has been read a third time without a reject but has not matched with the character in the buffer (remembering that the character in the buffer was placed there during the first time the character was not rejected), an assumption is made by the system that the new reading is like the second reading that has not been placed in the buffer and therefore the system stores the third non-rejected reading into the buffer. The error flip-flop V6 is not switched true during this process. In summary, when a character has the following code 10010 in flip-flops Y5 to Y9, respectively, and is being reread, and flip-flop V5 is true, this condition causes flip-flop Y11 to switch true which is the command to transfer the new reading to the flip-flops Y1 to Y4 even though flip-flop Y10 is false. The states of the Y5 to Y9 flip-flops are switched to 11000, respectively, and error flip-flop V6 remains false.

Although the above character that was transferred to the buffer 300 is probably right, as has been explained, the confidence flip-flop Y7 is false at the time signal $PC_5$ is formed. Therefore, a signal passes through AND gate 375 (FIG. 17) to switch flip-flop U2 true. At the start of the next scan, AND gate 376 passes a signal to OR gate 377 and to true input $u_1$ to switch flip-flop $U_1$ true. In turn, flip-flop $U_{5a}$ switches false before the scan counter can be reset at the formation of $PC_{11}$.

Again at the start of the next read scan, if the logical product is formed by signals $E_6$, $PC_6$, $K'_{10}$, $K_{11}$, and $K'_{12}$, all the cores in the eighth row are again switched to the one state together with flip-flop Y8.

The system is able to continue to read a row of characters until all the cores in the seventh row are in the one state. The condition when all the cores in the seventh row are in the one state is determined by flip-flop U2 being in the false state at the end of a scan. Flip-flop U2 is switched false at the start of each scan when the logical product is formed by signals $E_6$ and $PC_{15}$ at AND gate 432 and is not switched true unless the logical product is formed by signals $Y'_7$ and $PC_5$ at AND gate 375. If flip-flop U2 remains false during a scan, flip-flop $U_{5a}$ remains in the true state provided that the error flip-flop V6 also stays in the false state.

However, during a rescan of a row the system may be trying to form a match for one of the characters in a row but other characters may have been matched. Then during the rescan the characters that were matched could be now mismatched. For example, the system rereads a character and the states of flip-flops Y5 to Y9, after the buffer is read, are either 11110 or 11100, respectively. If the reject test produces a reject signal, the reject flip-flop V5 is switched false. Neither combination 11110 or 11100 switches flip-flop Y11 true and a transfer is prevented. Flip-flop Y5 is switched false by the logical product of signals $Y_6$, $V'_5$, and $PC_4$ formed in AND gate 460 (FIG. 18b). Then the combination 01100 is stored in the fifth to ninth rows of the memory 300 for that column and flip-flop U2 remains in the false state.

If there was no reject on the reread of a character, but a mismatch is indicated by flip-flop Y10 switching false, no transfer is performed, but the logical product of signals $Y_5$, $Y_8$, $Y'_9$, $Y'_{10}$, $V_5$, and $PC_4$ is formed by AND gate 395 (FIG. 19b) or the logical product of signals $Y_5$, $Y_7$, $Y'_8$, $Y'_9$, $Y'_{10}$, $V_5$ and $PC_4$ is formed by AND gate 461 to switch flip-flop Y6 false. Flip-flop V6 is also switched false because AND gate 387 (FIG. 24) passes a signal. Then the combination 10100 is stored in the fifth to ninth row of the memory for the column and the scan counter is not reset. If there is no reject and there is a match on the reread of the character, the flip-flops Y5, Y6, and Y7 remain in the same state. Again, when the row is checked to determine if the correct number of characters have been read for the row, the cores in the eighth row are all either in the one state or all in the zero state.

If another rescan is needed to perform a match and if after a character is reread, the flip-flops Y5 to Y9 are in the states 01100 or 01110, respectively, a reject does not affect the states for these flip-flops except that flip-flop Y8 is switched false by a signal passing through AND gate 394 (FIG. 21). If there is no reject but a mismatch occurs, the logical product is formed by signals $Y_6$, $Y_7$, and $PC_4$ in AND gate 462 (FIG. 18a) to pass a signal through OR gate 362 to switch flip-flop Y5 true. Flip-flop Y6 switches false when the logical product by signals $Y'_5$, $Y'_9$, $V_5$, $Y'_{10}$, and $PC_4$ is formed in AND gate 441 (FIG. 19b). Also flip-flop V6 switches true as either AND gate 389 or 392 (FIG. 24) passes a signal. If there is no reject and there is a match only, AND gate 462 (FIG. 18a) passes a signal to switch flip-flop Y5 true and flip-flop Y8 is switched false if it was true.

There is another condition to be described and that is when on rereading a character the system observes that the flip-flops Y5 to Y9 are in the states either 10100 or 10110, respectively. If a reject is formed AND gate 443 (FIG. 18b) passes a signal to switch flip-flop Y5 false and AND gate 463 (FIG. 19a) passes a signal to switch flip-flop Y6 true. Flip-flop Y8 switches false if it was true. If there is no reject but a mismatch occurs, the flip-flops Y5, Y6, and Y7 remain in the same state and a signal passes AND gate 448 (FIG. 21) to switch flip-flop Y8 false if it was true. Flip-flop V6 is switched true by a signal passing through AND gate 387 (FIG. 24). If there is no reject and there is a match, AND gate 463 (FIG. 19a) passes a signal to switch flip-flop Y6 true.

The following truth table defines the meanings of the states of flip-flops Y5 to Y9 wherein "1" denotes a true signal, "0" denotes a false signal, and "X" denotes either state:

| Y5 | Y6 | Y7 | Y8 | Y9 | |
|---|---|---|---|---|---|
| X | X | X | X | 1 | An entry not yet made in this column. |
| 0 | 0 | 0 | 0 | 0 | Reject in this column. |
| 0 | 0 | 0 | 1 | 0 | Reject in this column but column counter correctly counted eleven columns during the read scan. |
| 0 | 1 | 0 | 0 | 0 | Second read rejected in this column. |
| 0 | 1 | 0 | 1 | 0 | Second read rejected in this column but column counter correctly counted eleven columns during the read scan. |
| 0 | 1 | 1 | 0 | 0 | Two successful reads in this column and then a reject. |
| 0 | 1 | 1 | 1 | 0 | Two successful reads in this column and then a reject but column counter correctly counted eleven columns during the read scan. |
| 1 | 0 | 0 | 0 | 0 | Mismatch on second read in this column. |
| 1 | 0 | 0 | 1 | 0 | Mismatch on second read in this column but column counter correctly counted eleven columns during the read scan. |
| 1 | 0 | 1 | 0 | 0 | Two successful reads in this column and then a mismatch. |
| 1 | 0 | 1 | 1 | 0 | Two successful reads in this column and then a mismatch but column counter correctly counted eleven columns during the read scan. |
| 1 | 1 | 0 | 0 | 0 | First read in this column. |
| 1 | 1 | 0 | 1 | 0 | First read in this column but column counter correctly counted eleven columns during the read scan. |
| 1 | 1 | 1 | 0 | 0 | Two successful reads and a match in this column. |
| 1 | 1 | 1 | 1 | 0 | Two successful reads and a match in this column but column counter correctly counted eleven columns during the read scan. |

A summary of the above description will next be presented. The system reads a printed character in a particular column and then reads the code previously recorded for that particular column in the buffer 300. After the column in the buffer is read and if the flip-flops Y5 to Y9 assume any of the four following combinations of states, XXXX1, 00000, 00010, or 11000, respectively (the above truth table explains the meaning of these four combinations), the state of only flip-flop V5, the reject flip-flop, determines the states to which the flip-flops Y5 to Y9 are to be switched when signal $PC_4$ is formed. If flip-flop V5 is false during the time the states of the flip-flops Y5 to Y9 assume any one of the above four combinations, the flip-flops Y5 to Y9 are switched to assume the states 00000, respectively. However, if flip-flop V5 is true, the flip-flops Y5 to Y9 are switched to assume the states 11000, respectively, and flip-flop Y11 is switched true, which is the command to transfer the code in the flip-flops V1 to V4 to the flip-flops Y1 to Y4. No comparison operation is required when any of the above four combinations of states are present.

If the states of flip-flops Y5 to Y9 assume any one of the other combinations listed in the above truth table, then, for each of these other combinations, the states of flip-flops Y5 to Y9 assume any of three possible combinations of states at the formation of signal $PC_4$. The particular combination of states is determined by which one of three combinations of states flip-flop V5 and flip-flop Y10 (the comparison flip-flop) is in, as the flip-flops can be both false, or both true, or as flip-flop V5 can be true and flip-flop Y10 can be false. As an example, let it be assumed that flip-flops Y5 to Y9 are in the states 11010, respectively. First, if flip-flops V5 and Y10 are both false, then, at the formation of signal $PC_4$, flip-flops $Y5$ to $Y9$ assume the states 01000, respectively. Second, if flip-flops $V5$ and $Y10$ are both true, then, at the formation of signal $PC_4$, flip-flops $Y5$ to $Y9$ assume the states 11100, respectively. Third, if flip-flop $V5$ is true and flip-flop $Y10$ is false, then at the formation of signal $PC_4$, the flip-flops $Y5$ to $Y9$ assume the states 10000, respectively.

When the system is satisfied that the characters in the buffer 300 are decoded correctly because flip-flop $U5_a$ is true, the #1 and #2 scan counters 121a and 121b are reset accordingly as described above. Then on the formation of the logical product by signals $U_{5a}$ and $S_0$ (from #2 scan counter 121b) at AND gate 469 all the cores in the ninth row are switched to the one state to indicate that no entry is made in the buffer. Then before a new row of characters is stored in the buffer the preceding row is transferred to the output equipment 97 (FIG. 9). This is done by coupling the amplified signals from each sense line 321, 322, 323, 324 to the inputs of four AND gates 471 to 474, respectively. The signal $S_0$ from #2 scan counter 121b (FIG. 13) is also fed to the input of all four AND gates 471 to 474. The outputs of the four AND gates 471 to 474 are coupled to the output equipment 97. As mentioned above at the same time the characters are being scanned, the buffer is being read at the formation of signals $PC_1$ and $H_7$. When signal $S_0$ is present the information from the buffer is also transferred to the output equipment 97.

As mentioned above the system reads two sizes of font. The description above primarily described how the smaller size font is read. When the larger size font is to be read the current $M_1$ is applied to the solenoid 89' (FIG. 11) and the double arm contacts of switches 89a to 89m will assume the alternate position than the position shown in FIG. 11. The spacing of the two scan paths $t$ and $b$ is approximately .081 inch when the large font is being read whereby the two read apertures should be five apertures apart instead of four apertures apart as when the system is reading the small font. The current $M_1$ could be obtained from a suitable flip-flop (not shown) which may be switched true or false manually. Also when the larger size font is being read the program counter 106 is changed to count up to signal $PC_{19}$ for each character and then is switched off. This may be conveniently done by applying $PC'_{19}$ to AND gate 119 (FIG. 13) instead of $PC'_{15}$. The five imaginary vertical columns U, V, W, X, and Y for each large font are divided by the program counter 106 so that pulse $P_u$ rises at the rise of signal $PC_1$ and falls at the rise of $PC_3$, $P_v$ rises at the rise of $PC_3$ and falls at the rise of $PC_7$, $P_w$ rises at the rise of $PC_7$ and falls at the rise of $PC_{11}$, $P_x$ rises at the rise of $PC_{11}$ and falls at the rise of $PC_{15}$ and $P_y$ rises at the rise of $PC_{15}$ and falls at the fall of $PC_{18}$. The column counter 109 advances at $PC_{18}$ when signal $E'_6$ is formed instead of at $PC_{14}$. Also flip-flop $Z2$ is switched false at the fall of $PC_{18}$ instead of at the fall of $PC_{14}$. Then appropriate substitutions for signal $PC_8$ at AND gate 217 and for signal $PC_{13}$ at AND gate 218 are made so that the flip-flops C0 to C15 are reset after the period passes across the registration apertures a0 to a15. The above features are not shown but can be readily made by a person skilled in the art by following the teaching described herein.

In the light of the above teachings, various modifications and variations of the present invention are contemplated and will be apparent to those skilled in the art without departing from the spirit and scope of the invention. Therefore the invention is not limited to the exemplary apparatus or procedures described, but includes all embodiments within the scope of the claim.

What is claimed is:

1. In a character reading system, a record medium having a plurality of characters recorded thereon, registration scanning means for scanning each of said characters along a horizontal direction and over an area wider than the height of said characters and for producing electrical signals indicative of the relative position of each character in turn with respect to said registration scanning means, and a reading scanning means disposed in fixed relationship with said registration scanning means for reading each character in turn after it is registered by said registration scanning means so that vertically misaligned characters can be read by the system in one horizontal scan.

2. In a character reading system, a record medium having a plurality of characters recorded thereon, and scanning means for scanning said characters and for producing electrical signals corresponding thereto, said scanning means including a reading station having a first column of light sensitive registration apertures for producing electrical signals indicative of the registration of each character with respect to said first column, and a second column of light sensitive reading apertures responsive to said electrical signals for reading each character after it has been registered by said first column, a projection system for producing an image of said characters within the plane formed by said first and second columns of apertures, said projection system including a rotating mirror for sweeping the image of each of said characters in turn across said reading station so that the image is first swept across said first column and then across said second column allowing the first column to register the position of each character before said second column reads the respective character, and means for moving said record medium with respect to said projection system in the direction parallel to the column of apertures.

3. In a character reading system, a record medium having a plurality of characters recorded thereon, scanning means for scanning each of said characters and for producing electrical signals corresponding thereto, said scanning means including a reading station having a first column of light sensitive registration apertures and a second column of light sensitive reading apertures disposed parallel to said first column, a projection system including a rotating mirror and a lens for reflecting, focusing, and sweeping an image of each of said characters, in turn, across said first column of apertures and then across said second column of apertures, and logical circuitry means included in said system and including means responsive to said first column of apertures for registering the position of each image with respect to said reading station and for gating selected reading apertures in said second column to an identifying unit whereby each of said characters is identified by said system.

4. In a character reading system, a record medium having a plurality of characters printed in transverse rows thereon, said characters in each respective row being permitted to be vertically misaligned relative to each other, registration scanning means for scanning a row of characters in a direction substantially parallel to said rows for producing signals defining the vertical registration of each character in a row, reading scanning means spaced from said registration scanning means and disposed to read, along a plurality of closely spaced paths, each character in a row after the respective character has been vertically registered by said registration scanning means and for producing information signals corresponding to the portions of the characters located along said paths, identifying means, and logical circuitry means for selecting character information signals from at least two of said paths for each character, in turn, in response to the vertical registration, signals for each character as determined by said registration scanning means and gating said character information signals of said two paths to said identifying means, whereby a row of characters is decoded by said identifying means during a single scan of said scanning means.

5. In a character reading system, a record medium having a plurality of characters recorded thereon, a read station, means for scanning said characters and forming images of said characters which sweep across said read station, said read station including a first column of light sensitive registration apertures and a second column of light sensitive reading apertures for receiving the light forming said images, a plurality of optical detection means coupled to each of said apertures of said first and second columns for producing separate position modulated electrical output signals in response to the variation in light intensity received by each of said apertures, a plurality of registration flip-flops each coupled to one of said optical detection means of said first column of apertures whereby the state of each of said registration flip-flops switches in response to said signals to form a character-position information signal, a plurality of registration memory flip-flops, first logical circuitry means for coupling said character-position information signal to said registration memory flip-flops for storage therein, and second logical circuitry means responding to the signals from said memory flip-flops for gating signals sensed by selected ones of said reading apertures of said second column to said system.

6. In a character reading system, a record medium having a plurality of characters recorded thereon, a read station, means for scanning said characters and forming an image of each of said characters which image sweeps across said read station, said read station including a first column of light sensitive registration apertures and a second column of light sensitive reading apertures for receiving the light forming said image, a plurality of optical detection means each coupled to said apertures of said first and second columns for producing separate position modulated electrical output signals in response to the light received by each of said apertures, a plurality of registration flip-flops each coupled to one of said optical detection means of said first column of apertures whereby each of said registration flip-flops switches state to form a character-position information signal, and logical circuitry means responsive to said character-position information signal for gating said position modulated signals derived from selected ones of said apertures of said second row.

7. In an apparatus for translating a plurality of alphanumerical characters recorded horizontally in rows on a record medium and in vertical misalignment within each row, said characters being stylized to have an upper and a lower spaced portion, and each portion having character segments oriented vertically in predetermined position locations, scanning means for scanning across said characters in a direction so as to traverse said segments, a read station having a plurality of light sensitive registration apertures disposed in a first column, and a plurality of light sensitive read apertures disposed in a second column, said scanning means comprising a projection system including a multi-facet rotating mirror for reflecting and sweeping each of said characters across said first column of registration apertures and then across said second column of read apertures of said read station, optical detection means coupled to each of said registration apertures and each of said read apertures for producing separate position modulated electrical signals in response to the variation in light intensity received by each of said apertures, said electrical signal as produced by said optical detection means of said first column by one of said characters passing thereacross being indicative of the vertical position of said one character with respect to said read station, first logical circuitry means responsive to said signal from said first column for selecting and gating the electrical signals from two of said read apertures which are in position to scan across said upper and lower portions of said one character before said one character sweeps across said second column, second circuitry means responsive to said two read apertures for reading said one character while said first circuitry means records the vertical position of another character following said one character for again selecting two read apertures to read said other character whereby all the characters in a row are read in one scan of the record medium by one facet of said rotating mirror.

8. In a character reading system, a record medium having a plurality of characters recorded thereon, scanning means for scanning said characters and for producing electrical signals corresponding thereto, and two reading stations each having two substantially parallel columns of light sensitive apertures comprising a first column of registration apertures and a second column of read apertures, said scanning means comprising optical means including a lens, a beam splitter and rotating mirror for forming an image of said characters simultaneously on each said reading station, said mirror being disposed to rotate about an axis parallel to its reflecting surface for sweeping both images of each character simultaneously first across the respective first column of apertures and then across the respective second column of apertures whereby each of said apertures senses a path across said characters, said apertures of one of said reading stations sensing different portions of the character from the portions of the same character that said apertures of the other of said reading stations sense.

9. In a character reading system, a record medium having a plurality of characters recorded transversely in rows thereon, scanning means for scanning said characters by rows simultaneously along a plurality of closely spaced paths and across said record medium and for producing electrical signals corresponding thereto, the number of said paths being sufficient to cover a row of characters when the row is in the correct position with respect to the scanning means, said record medium being disposed to move in a direction substantially perpendicular to the direction of said rows placing each row of characters, in turn, within said paths, first logical circuitry means for detecting when any one of said characters in a row of characters is in a position with respect to said paths to be read by said system and then recording the number of times a row is scanned for a complete reading of the row, second logical circuitry means responsive to said first logical circuitry means for providing and determining a predetermined number of scans to be performed by the sytem before an attempt is made to read the following row of characters, whereby the characters in said one row that has been read will not be reread by said system when attempting to read the following row.

10. In a character reading system, a record medium having a plurality of characters recorded thereon, said characters being printed in at least two size fonts, scanning means for scanning said characters and for producing electrical signals corresponding thereto, and a reading station having a first column of light sensitive registration apertures and a second column of light sensitive reading apertures disposed parallel to and spaced from said first column, said scannig means comprising a projection system including a rotating mirror for reflecting and sweeping said characters across said first column of apertures whereby the position of one of said characters is sensed with respect to said reading station and then for sweeping said one character across said second column of apertures, said system also including an identifying unit, logical circuitry means for registering the position of said one character and for gating selected apertures in said second column to said identifying unit whereby said one character is identified by said system, means for varying the spacing between said first and second columns, and means for conditioning said logical circuitry means to selectively gate different apertures in said second column to said identifying unit, whereby the system reads different size fonts.

11. In a character reading system, a record medium having a plurality of characters recorded in transverse rows thereon, scanning means for scanning a row of characters in a direction parallel to said rows simultaneously along more than two spaced paths and for producing a series of time related electrical signals for each of said paths, said series of time related electrical signals for each of said paths being produced simultaneously, identifying means for identifying a character in response to the electrical signals, logical circuitry means having coupled thereto continuously the electrical signals as produced by at least two of said paths and being responsive to said electrical signals for selecting and gating continuously the electrical signals from selected ones of said paths to said identifying means for each character in turn, means for detecting when said electrical signals gated to said identifying means are not identified as a character that is used in the system, means for automatically performing at least one re-scan of the row of characters containing the character producing the unidentifiable electrical signals, and buffer means for storing character identification data corresponding to characters identified by said identifying means, said means for performing a re-scan of a row being respective to said buffer means.

12. In an apparatus for optically translating characters recorded in rows on a record medium in designated column positions wherein characters thereon are stylized to have upper and lower spaced portions and each portion has character segments in predetermined position locations, optical scanning means for scanning each character in turn along said rows on said record medium a plurality of times so as to traverse said segments, optical detecting means coupled to said optical scanning means for producing position modulated output signals in response to the sensing by said sensing means of the presence or absence of a segment in each position of said portions, said scanning means and detecting means also producing character recognition signals for each character in turn in response to said position modulated signals, buffer means for storing in respective column positions said character recognition signals for each character, means for comparing the recognition signals representing one of said characters in a particular column position as produced with the recognition signals for the character stored in the respective column positions in the buffer means to produce an error signal in response to said comparison means when the signals are not equal, and means responsive to said error signal for automatically initiating a re-scan of said one character by said scanning means.

13. In a character recognition system, a printed record medium having a plurality of characters printed transversely in rows thereon, scanning means for scanning said characters in rows across said record medium and for producing electrical signals corresponding to the portions of the characters scanned, said record medium being disposed to move in a direction perpendicular to the scanning direction, first logical circuitry means responsive to said scanning means for detecting when said scanning means detects the edge of said record medium and each character in a row in turn, a program counter means responsive to said first logical circuitry means for forming a program count in response to the edge of said record medium and each of said characters in said row, identifying means for identifying a character in response to said electrical signals, said scanning means including means for scanning along more than two spaced paths during each scan thereof and for producing said electrical signals for each of said paths, second logical circuitry means responsive to said electrical signals for gating the electrical signals from selected ones of said paths to said identifying means for each character in a row in turn, said identifying means being responsive to said program counter means for decoding the electrical signal gated thereto, and third logical circuitry means responsive to said program count as formed by said program counter means in response to the edge of said record medium for detecting errors in the characters read for the row of the previous scan and commanding a re-scan of the row for correcting said errors.

14. In a character recognition system, a printed record medium having a pluarlity of characters printed thereon, scanning means for scanning each of said characters simultaneously on at least two paths across the character and producing electrical signals for each path corresponding to the portions of the characters scanned along the respective paths, a buffer, means for recording the electrical signals produced by at least two paths during each scan of each character, comparison means coupled to said scanning means and to said buffer means for comparing the signals produced by the same two paths across the character during different scans of one of said characters, and means coupled to said comparison means for indicating the results of said comparison.

15. In a character reading system, a record medium having a plurality of characters recorded transversely in rows thereon, a read station, means for scanning said characters by rows across said record medium and for forming an image of each of said characters which image sweeps across said read station, said read station having a first column of light sensitive registration apertures and a second column of light sensitive reading apertures disposed substantially parallel to each other, said apertures in said first and second columns extending over a length greater than the height of said character images, said record medium being disposed to move in a direction parallel with respect to said first and second columns, a plurality of optical detection means each responsive to one of said apertures in said first and second columns for producing electrical signals that are time related to the light intensity received by said apertures, first logical circuitry means responsive to the electrical signals produced by said apertures of said first column for detecting when a row of characters is in a position to be read by the system, and second logical circuitry means for providing a predetermined number of scans between the time one row of characters has been read and the time that the next row is to be read whereby said one row that has been read will not be reread by said system.

16. In a character reading system, a record medium having a plurality of characters recorded transversely in rows thereon, a read station, means for scanning said characters by rows across said record medium and for forming an image of each of said characters which image sweeps across said read station, said read station having a first column of light sensitive registration apertures and a second column of light sensitive reading apertures disposed substantially parallel to each other in a common plane, said apertures in said first and said second columns extending over a length greater than the height of said character image, said record medium being disposed to move with respect to said read station in a direction substantially perpendicular to the row of characters, optical detection means responsive to said apertures in said first and second columns for producing electrical signals that are time related to the light intensity received by each of said apertures, said image being focused onto the plane of said apertures and being swept first across said first column and then across said second column, first logical circuitry means responsive to the electrical signals produced by said apertures of said first column for recording the position of said image and for gating the electrical signals produced by selected ones of said apertures in said second column to a character recognition unit whereby the character forming the image is read by the system, said first logical circuitry means including means for detecting when a row of characters is in position to be read by the system, and second logical circuitry means for providing a predetermined number of scans between the time one row of characters has been read and the time the next row is to be read whereby said one row that has been read will not be reread by said system.

17. In a character reading system, a record medium having a plurality of characters recorded thereon, scanning means for scanning said characters simultaneously along a plurality of closely spaced paths and producing for each of said paths electrical signals corresponding thereto, said record medium being disposed to move continuously with respect to said scanning means in a direction normal to said paths, means for identifying a character in response to the electrical signals produced in some of said paths as a result of the scanning of said character by said scanning means, means for detecting when said electrical signals are not identified as a character that is used in the system to produce an error signal, and means responsive to the error signal for automatically performing at least one re-scan of the character producing the unidentified electrical signals while said record medium is moving continuously in said direction and causing the electrical signals from said other ones of said paths to be coupled to said means for identifying.

18. In a character reading system, a record medium having a plurality of characters recorded in transverse rows thereon and disposed to move in a direction perpendicular to said rows, scanning means for scanning a row of characters in a direction parallel to said rows simultaneously along more than two spaced paths and for producing a series of time related electrical signals for each of said paths, said series of time related electrical signals for each of said paths being produced simultaneously, identifying means for identifying a character responsive to said electrical signals, logical circuitry means responsive to said electrical signals for selecting and gating the electrical signals from selective ones of said paths to said identifying means for each character in turn, means for detecting when said electrical signals are not identifying as a character that is used in the system to produce an error signal, and means responsive to said error signal for automatically performing at least one re-scan of the row of charcters containing the character producing the unidentifiable electrical signals while said record medium is continuously moving in said direction and causing the electrical signals from selective other ones of said paths to be gated to said identifying means.

19. In a character recognition system, a printed record medium having a plurality of characters printed transversely in rows thereon, scanning means for scanning said characters in rows across said record medium and for producing electrical signals corresponding to the portions of the characters scanned, said record medium being disposed to move in a direction perpendicular to the scanning direction, first logical circuitry means for detecting when a row of characters is positioned to be read by said system, an identifying means for identifying a character in response to said electrical signals, said scanning means including means for scanning along more than two spaced paths during each scan thereof and for producing said electrical signals for each of said paths, said system including second logical circuitry means for selecting and gating the electrical signals from selected ones of said paths to said identifying means for each character in a row in turn, a buffer means for storing each character as identified by said identifying means, comparison means coupled to said scanning means and identifying means for comparing corresponding characters in a row as read during different scans of the row, means coupled to said comparison means for indicating the results of said comparison, and third logical circuitry means for providing a predetermined number of scans between the time one row of characters has been read and the time the next row is to be read whereby said one row that has been read will not be reread by the system.

20. In the character reading system of claim 21 wherein said scanning means further includes a read station having a first column of light sensitive registration apertures and a second column of light sensitive reading apertures, a rotating mirror for reflecting and sweeping each of said characters in turn across said reading station, and a lens for focusing an image of the characters onto said read station and said apertures.

21. In a character reading system, a record medium having a plurality of characters recorded in rows thereon, each of said characters being stylized to have upper and lower spaced portions and each portion having character segments in predetermined position locations, the stylizing of each of said characters being that when said characters are scanned through two appropriate parallel paths through their upper and lower portions, the position of each of said character segments is indicative of the character being so scanned, two reading stations each having a first column of closely spaced registration apertures and a second column of closely spaced read apertures disposed substantially parallel to each other, optical means including a multi-facet rotating mirror, a lens, and a beam splitter for reflecting and sweeping the light from said record medium across both said reading stations and for focusing an image of each character simultaneously on each read station, said apertures on one reading station being positioned with respect to said apertures on the other reading station so that said apertures on one station scan different ones of said parallel paths than said apertures of the other reading station, and means for selecting only two read apertures that coincide with said two appropriate parallel paths through said characters for reading each of said characters in turn as they cross said read apertures.

22. A character reading system for reading a plurality of characters recorded in rows on a record medium and the characters in one row having a different size font than the characters in another row, said system including: a first column of registration apertures; a second column of reading apertures disposed parallel to and spaced from said first column; scanning means for scanning each character in turn first across said first column of apertures to produce a character registration signal and then scanning the character across said second column of apertures to produce character information signals corresponding to the portion of the character crossed by each of said reading apertures; and means for varying the spacing between said first and second columns to ensure that the spacing between columns is slightly more than the width of the characters in the row being read and is less than the center to center spacing between the characters in the same row.

References Cited by the Examiner

UNITED STATES PATENTS

| | | | |
|---|---|---|---|
| 2,170,132 | 8/1939 | Eitzen | 340—146.3 |
| 2,222,937 | 11/1940 | Dimmick | 340—146.3 |
| 2,370,160 | 2/1945 | Hansell | 340—146.3 |
| 2,769,922 | 11/1956 | Peery | 340—146.3 |
| 2,927,216 | 3/1960 | Lohninger | 340—146.3 |
| 2,932,006 | 4/1960 | Glauberman | 340—146.3 |
| 3,104,369 | 9/1963 | Rabinow | 340—146.3 |

(Other references on following page)

UNITED STATES PATENTS

| | | | |
|---|---|---|---|
| 3,105,956 | 10/1963 | Greanias | 340—146.3 |
| 3,114,980 | 12/1963 | Davis | 340—146.3 |
| 3,159,814 | 12/1964 | Rabinow | 340—146.3 |
| 3,160,853 | 12/1964 | Howard | 340—146.3 |

FOREIGN PATENTS

| | | |
|---|---|---|
| 1,211,018 | 10/1959 | France. |
| 1,088,745 | 9/1960 | Germany. |
| 820,283 | 9/1959 | Great Britain. |
| 905,133 | 9/1962 | Great Britain. |
| 932,414 | 7/1963 | Great Britain. |

OTHER REFERENCES

Pages 173–175, April 1957, "Reading by Electronics," Wireless World.

Pages 57–60, November 1962, "Image Registration Detection System" by D. C. Flemming, IBM Technical Disclosure Bulletin, vol. 5, No. 6.

DARYL W. COOK, *Acting Primary Examiner.*

MALCOLM A. MORRISON, *Examiner.*

J. E. SMITH, *Assistant Examiner.*